(12) United States Patent
Maekawa

(10) Patent No.: US 10,050,940 B2
(45) Date of Patent: Aug. 14, 2018

(54) CONNECTION CONTROL SYSTEM, MANAGEMENT SERVER, CONNECTION SUPPORT METHOD, AND NON-TRANSITORY COMPUTER-READABLE RECORDING MEDIUM ENCODED WITH CONNECTION SUPPORT PROGRAM

(71) Applicant: Konica Minolta, Inc., Chiyoda-ku, Tokyo (JP)

(72) Inventor: Hiroaki Maekawa, Kawanishi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/790,501

(22) Filed: Jul. 2, 2015

(65) Prior Publication Data
US 2016/0014088 A1    Jan. 14, 2016

(30) Foreign Application Priority Data
Jul. 10, 2014   (JP) ................... 2014-142062

(51) Int. Cl.
*H04L 29/06*   (2006.01)
*H04L 29/08*   (2006.01)
(52) U.S. Cl.
CPC ........ *H04L 63/0281* (2013.01); *H04L 63/029* (2013.01); *H04L 67/141* (2013.01); *H04L 67/10* (2013.01)
(58) Field of Classification Search
CPC ... H04L 63/0821; H04L 63/02; G06F 3/1236; G06F 15/16
See application file for complete search history.

(56) References Cited

U.S. PATENT DOCUMENTS

| 9,369,432 | B2 * | 6/2016 | Qin ..................... H04L 63/02 |
| 2007/0214501 | A1 * | 9/2007 | Muramoto .......... H04L 63/0236 726/11 |

(Continued)

FOREIGN PATENT DOCUMENTS

JP    2011-192114 A    9/2011

*Primary Examiner* — Eleni A Shiferaw
*Assistant Examiner* — Hee K Song
(74) *Attorney, Agent, or Firm* — Buchanan Ingersoll & Rooney PC

(57) ABSTRACT

A connection control system includes a management server outside firewall, supporting connection of communications between a control target device inside firewall and a cloud server outside firewall, and a relay device communicating with the control target device inside firewall. A processor included in the management server registers association information associating the cloud server and the relay device with the control target device, establishes an always-on session with the relay device, and upon reception of a connection request, transmits to the relay device via the always-on session a connection instruction to relay communications with the cloud server associated with the control target device by the association information. A processor included in the relay device, upon reception of the connection instruction, establishes a first communication session with the cloud server, establishes a second communication session with the control target device, and relays communications between the cloud server and the control target device.

19 Claims, 17 Drawing Sheets

(56) References Cited

U.S. PATENT DOCUMENTS

| | | | |
|---|---|---|---|
| 2010/0169497 A1* | 7/2010 | Klimentiev | G06F 9/546 709/228 |
| 2011/0126270 A1 | 5/2011 | Sato et al. | |
| 2011/0194140 A1* | 8/2011 | Sweet | G06F 3/1204 358/1.15 |
| 2012/0054851 A1* | 3/2012 | Piazza | H04L 63/0209 726/12 |
| 2012/0278479 A1* | 11/2012 | Miller | H04L 12/4633 709/224 |
| 2013/0174246 A1* | 7/2013 | Schrecker | H04L 63/029 726/14 |
| 2015/0009999 A1* | 1/2015 | Oguchi | H04L 45/72 370/392 |
| 2015/0074259 A1* | 3/2015 | Ansari | H04L 67/02 709/224 |

* cited by examiner

F I G. 2
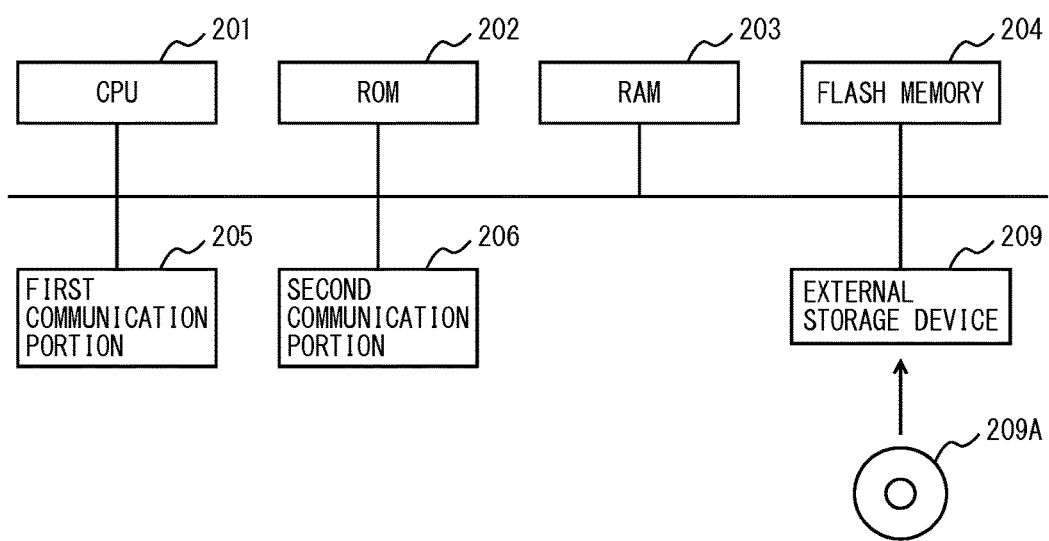

FIG. 5

CLOUD CONNECTION INFORMATION

| ASSIGNED ID | ASSIGNED CLOUD ID | AUTHENTICATION KEY |
|---|---|---|
| COMPANY A G/W ID | COMPANY A CLOUD ID | key-1 |

FIG. 6

ALWAYS-ON SESSION INFORMATION

| GATEWAY | CONTROL TARGET DEVICE |
|---|---|
| COMPANY A G/W ID | MFP-1 |
| COMPANY A G/W ID | MFP-2 |
| COMPANY A G/W ID | MFP-3 |

FIG. 7

FOR-LOAN ASSOCATION INFORMATION

| DEVICE ADDRESS INFORMATION | | USER ID | SHARED DESTINATION CLOUD ID |
|---|---|---|---|
| GATEWAY | CONTROL TARGET DEVICE | | |
| MFP-1 | COMPANY A G/W ID | COMPANY B USER ID | COMPANY B CLOUD ID |

FIG. 8

FOR-BORROWING ASSOCIATION INFORMATION

| DEVICE ADDRESS INFORMATION | | SHARED SOURCE CLOUD ID |
|---|---|---|
| GATEWAY | CONTROL TARGET DEVICE | |
| MFP-1 | COMPANY A G/W ID | COMPANY A CLOUD ID |

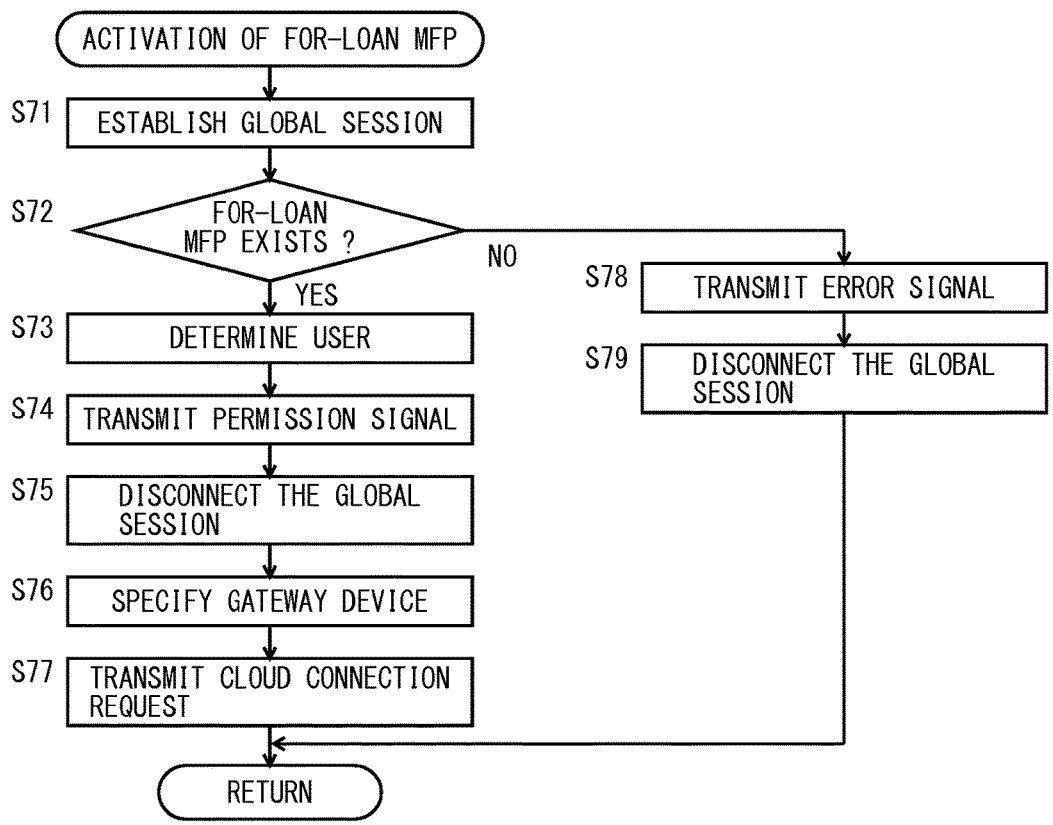
F I G. 1 8

CONNECTION CONTROL SYSTEM, MANAGEMENT SERVER, CONNECTION SUPPORT METHOD, AND NON-TRANSITORY COMPUTER-READABLE RECORDING MEDIUM ENCODED WITH CONNECTION SUPPORT PROGRAM

This application is based on Japanese Patent Application No. 2014-142062 filed with Japan Patent Office on Jul. 10, 2014, the entire content of which is hereby incorporated by reference.

BACKGROUND OF THE INVENTION

Field of the Invention

The present invention relates to a connection control system, a management server, a connection support method, and a non-transitory computer-readable recording medium encoded with a connection support program. More particularly, the present invention relates to a connection control system which controls communications between a device located outside a firewall and a device located inside the firewall, a management server which supports communications between a device located outside a firewall and a device located inside the firewall, a connection support method which is executed by the management server, and a non-transitory computer-readable recording medium encoded with a connection support program which is executed by the management server.

Description of the Related Art

A multi-function peripheral (hereinafter, referred to as "MFP") which is connected to a local area network (LAN) may be controlled by using a service provided from a cloud server which is connected to the Internet. For example, an MFP may be caused to print data stored in a cloud server. However, it is often the case that an MFP is connected to a LAN and the LAN is connected to the Internet via a firewall. Therefore, an access from the cloud server to the MFP may be blocked by the firewall.

Further, a user who is not registered in an MFP is not authorized to use the MFP and therefore unable to use the MFP. Japanese Patent Laid-Open No. 2011-192114 discloses an image forming system wherein a user manager sever manages authorization to use an MFP. However, there is a problem that it is necessary to set authorizations in the user manager sever respectively for each of groups and users. Specifically, in the case where administrators of a plurality of MFPs are different from each other, there may be a problem that a common user manager server can not be provided.

SUMMARY OF THE INVENTION

According to an aspect of the present invention, a connection control system including a management server disposed outside a firewall and capable of supporting connection of communications between a control target device disposed inside the firewall and a cloud server disposed outside the firewall, and a relay device capable of communicating with the control target device disposed inside the firewall, the connection control system includes: a processor included in said management server configured to execute an internal common setting step of registering association information for associating said control target device with said cloud sever and said relay device, a server-side session establishing step of, on the basis of a request from said relay device, establishing an always-on session for communicating with said relay device, and a connection instructing step of, in response to reception of a connection request of specifying said control target device connected to said relay device, transmitting via said established always-on session to said relay device specified by said connection request a connection instruction to relay communications between the control target device specified by said connection request and said cloud server associated by said association information with a control target device specified by said connection request; and a processor included in said relay device is configured to execute a first communication session establishing step of, in response to reception of said connection request, establishing a first communication session with said cloud server specified by said connection instruction, a second communication session establishing step of establishing a second communication session with said control target device, and a relay step of relaying communications between said cloud server and said control target device, using said first and second communication sessions.

According to another aspect of the present invention, a management server disposed outside a firewall and capable of causing a relay device disposed inside the firewall to relay communications between a control target device disposed inside the firewall and a cloud server disposed outside the firewall, the management server includes a processor included in said management server configured to execute: an internal common setting step of registering association information for associating said cloud sever and said relay device with said control target device; a server-side session establishing step of, on the basis of a request from said relay device, establishing an always-on session for communicating with said relay device; and a connection instructing step of, in response to reception of a connection request of specifying said control target device connected to said relay device, transmitting via said established always-on session to said relay device specified by said connection request a connection instruction to connect a control target device specified by said connection request to said cloud server associated by said association information with a control target device specified by said connection request.

According to a further aspect of the present invention, a connection support method performed by a management server disposed outside a firewall and capable of causing a relay device disposed inside the firewall to relay communications between a control target device disposed inside the firewall and a cloud server disposed outside the firewall, the method includes: an internal common setting step of registering association information for associating said control target device with said cloud sever and said relay device; a server-side session establishing step of, on the basis of a request from said relay device, establishing an always-on session for communicating with said relay device; and a connection instructing step of, in response to reception of a connection request of specifying said control target device connected to said relay device, transmitting via said established always-on session to said relay device specified by said connection request a connection instruction to relay communications between a control target device specified by said connection request and said cloud server associated by said association information with a control target device specified by said connection request.

According to a further aspect of the present invention, a non-transitory computer-readable recording medium encoded with a connection support program executed by a computer controlling a management server disposed outside a firewall and capable of causing a relay device disposed inside the firewall to relay communications between a control target device disposed inside the firewall and a cloud server disposed outside the firewall, wherein the connection support program causes the computer to execute: an internal common setting step of registering association information for associating said control target device with said cloud sever and said relay device; a server-side session establishing step of, on the basis of a request from said relay device, establishing an always-on session for communicating with said relay device; and a connection instructing step of, in response to reception of a connection request of specifying said control target device connected to said relay device, transmitting via said established always-on session to said relay device specified by said connection request a connection instruction to relay communications between a control target device specified by said connection request and said cloud server associated by said association information with a control target device specified by said connection request.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 2 is a block diagram schematically showing an exemplary hardware configuration of a gateway device;

FIG. 5 shows an example of cloud connection information;

FIG. 6 shows an example of always-on session information;

FIG. 7 shows an example of for-loan association information;

FIG. 8 shows an example of for-borrowing association information;

FIG. 18 is a flowchart illustrating an exemplary flow of a loaned MFP activation process;

DESCRIPTION OF THE PREFERRED EMBODIMENTS

Figure 1:
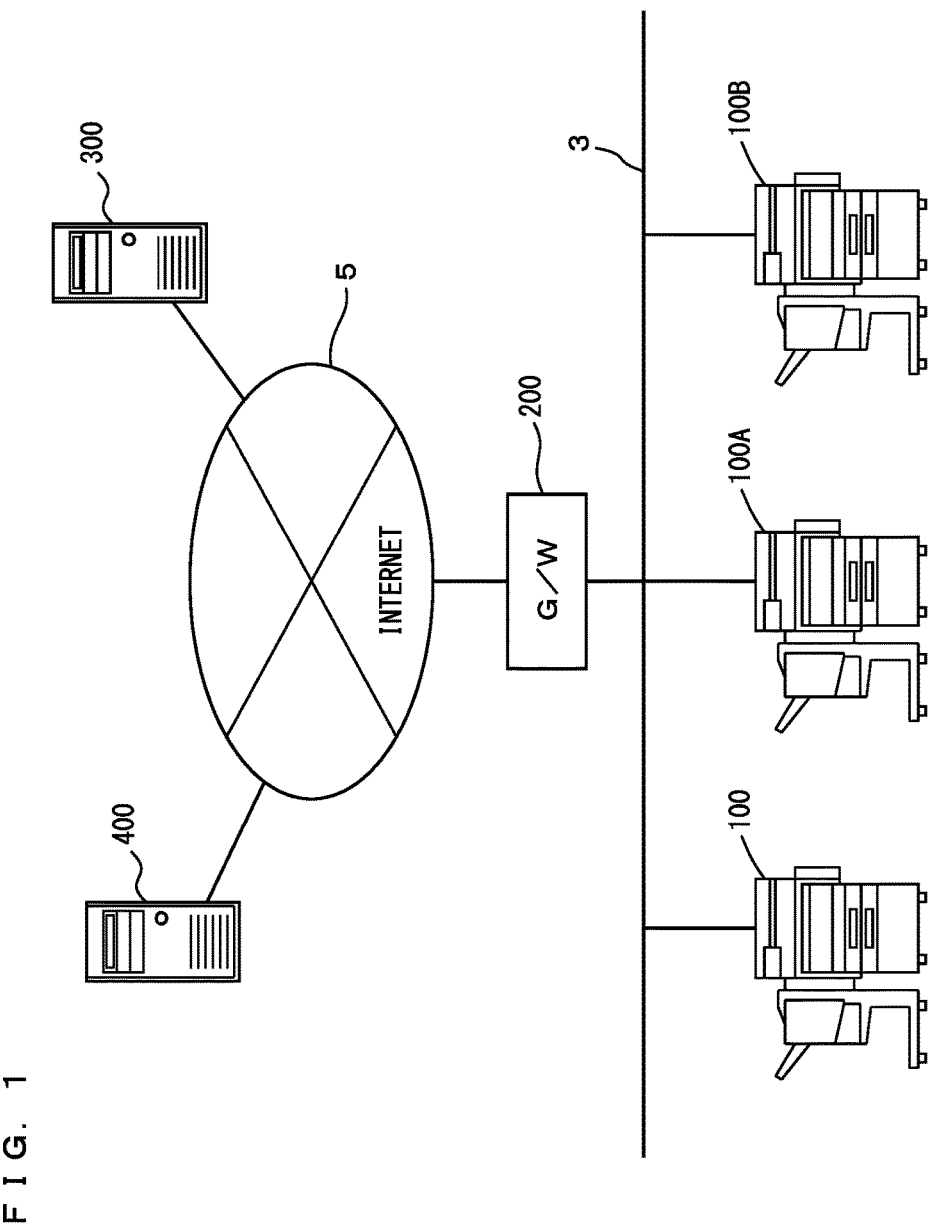
FIG. 1 schematically shows, by way of example, a connection control system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 schematically shows, by way of example, a connection control system according to an embodiment of the present invention. Referring to FIG. 1, a connection control system 1 includes a management server 300, a gateway (G/W) device 200 which functions as a relay device, and multi-function peripherals (MFPs) 100, 100A, and 100B. Management server 300 and gateway device 200 are each connected to Internet 5, and they can communicate with each other via Internet 5. Further, management server 300 and gateway device 200 each can communicate with another computer which is connected to Internet 5. Here, a cloud server 400 is shown as an example of such another computer connected to Internet 5.

Further, gateway device 200 is connected to a local area network (LAN) 3, and MFPs 100, 100A, and 100B are also connected to LAN 3. Gateway device 200 can communicate with MFPs 100, 100A, and 100B connected to LAN 3. Further, gateway device 200 and MFPs 100, 100A, and 100B each can communicate with another computer which is connected to LAN 3.

Gateway device 200 has a firewall function, and connects LAN 3, which is located inside the firewall, with Internet 5, which is located outside the firewall. Gateway device 200 restricts accesses from management server 300 and cloud server 400, which are connected to Internet 5, to MFPs 100, 100A, and 100B, which are connected to LAN 3. The firewall function of gateway device 200 is not limited to a particular type, but it may be a packet filtering firewall function which determines whether to permit a communication or not on the basis of an address included in a packet. Alternatively, it may be an application-layer gateway firewall function which is a proxy that performs and controls a communication with the outside at an application layer protocol level. It should be noted that gateway device 200 is disposed inside the firewall.

In connection control system 1 according to the present embodiment, it is assumed that MFPs 100, 100A, 100B, and gateway device 200 are managed by Company A. In this case, a member of Company A, for example, is registered in each of MFPs 100, 100A, and 100B as a user who is authorized to use each of MFPs 100, 100A, and 100B. It is noted that a user who is authorized for use may be registered in each of MFPs 100, 100A, and 100B, and authenticated by each of MFPs 100, 100A, and 100B. Alternatively, an authentication server may be connected to LAN 3 so as to register a user who is authorized to use each of MFPs 100, 100A, and 100B, and the authentication server may authenticate the user on behalf of each of MFPs 100, 100A, and 100B.

Management server 300 and cloud server 400 are typical computers and function as a cloud. A cloud is a computer which provides a predetermined service. The service provided by the cloud is not limited to a particular type, but may be a data process executed by a computer, for example, a service for managing a version of a program, a service for storing data (as a file server), an image processing service for processing image data, and a translation service for translating a language into another language. An image process is not limited to a particular type, but may be a process for execution of sharpening and smoothing image data in which a photograph is represented, and may be a process of character recognition of image data in which a character is represented. Management server 300 and cloud server 400 each executes user authentication in order to provide a service to a predetermined user. Management server 300 and cloud server 400 each registers in advance a user ID and a password of a user to be authorized to use management server 300 and cloud server 400, and provides the service on the condition that authentication by using the user ID and the password is successful for an access from an external computer. It is noted here that a method for the user authentication is not limited to authentication by using the user ID and the password, but may be another method.

In connection control system 1 according to the present embodiment, a cloud of management server 300 is exemplified as a cloud managed by Company A, and a cloud of cloud server 400 is exemplified as a cloud managed by Company B, another company different from Company A. Therefore, a member of Company A is authorized to use MFPs 100, 100A, and 100B, and the cloud of management server 300, whereas a member of Company B is not authorized to use MFPs 100, 100A, 100B, and the cloud of management server 300. On the other hand, the member of Company B is authorized to use the cloud of cloud server 400.

In other words, at least part of users who are the same as the users registered in each of MFPs 100, 100A, and 100 B under the management of Company A are registered in management server 300. Since each of MFPs 100, 100A, and 100 B is under the management of Company A, the member of Company A is registered as a user, while the member of Company B is registered as a user in cloud server 400.

Like this, management server 300 and cloud server 400 have the same functions, however, are different from each other on the point that management server 300 functions as a cloud for Company A, whereas cloud server 400 functions as a cloud for Company B. In other words, the member of Company A can log in to use MFPs 100, 100A, 100B, and management server 300, but is unable to log in cloud server 400; whereas the member of Company B can not log in MFPs 100, 100A, 100B, and management server 300, but is able to log in to use cloud server 400.

Management server 300 and cloud server 400 have the same hardware configurations and functions, and therefore, a description thereof will not be provided here. MFPs 100, 100A, and 100B have common hardware configurations and functions, and therefore, unless otherwise specified, MFP 100 will be described representatively.

FIG. 2 is a block diagram schematically showing an exemplary hardware configuration of a gateway device. Referring to FIG. 2, gateway device 200 according to the present embodiment includes: a central processing unit (CPU) 201 which is responsible for overall control of gateway device 200; a read only memory (ROM) 202 for storing, among others, a program to be executed by CPU 201; a random access memory (RAM) 203 used as a work area for CPU 201; a flash memory 204 which stores data in a non-volatile manner; a first communication portion 205; a second communication portion 206; and an external storage device 209.

First communication portion 205 is a communication interface (I/F) for connecting gateway device 200 to Internet 5. Second communication portion 206 is a communication interface (I/F) for connecting gateway device 200 to LAN 3.

Flash memory 204 stores a program executed by CPU 201 or data necessary for execution of the program. CPU 201 loads the program stored in flash memory 204, into RAM 203 for execution. External storage device 209 is detachably attached to gateway device 200, and it can be mounted with a compact disc CD-ROM 209A in which a program is stored. CPU 201 is capable of accessing CD-ROM 209A via external storage device 209. CPU 201 can load a relay program, which is stored in CD-ROM 209A mounted on external storage device 209, into RAM 203 for execution.

While the program stored in flash memory 204 or CD-ROM 209A has been described as the program executed by CPU 201, another computer connected to Internet 5 may rewrite the program stored in flash memory 204, or may additionally write a new program therein. Further, gateway device 200 may download a program from another computer connected to Internet 5. As used herein, the "program" includes, not only the program which CPU 201 can execute directly, but also a source program, a compressed program, an encrypted program, and others.

It is noted that the medium for storing the program executed by CPU 201 is not restricted to CD-ROM 209A. It may be an optical disc (a magneto-optical (MO) disc, a mini disc (MD), or a digital versatile disc (DVD)), an IC card, an optical card, or a semiconductor memory such as a mask ROM, an erasable programmable ROM (EPROM), an electrically erasable and programmable ROM (EEPROM), or the like.

Figure 3:
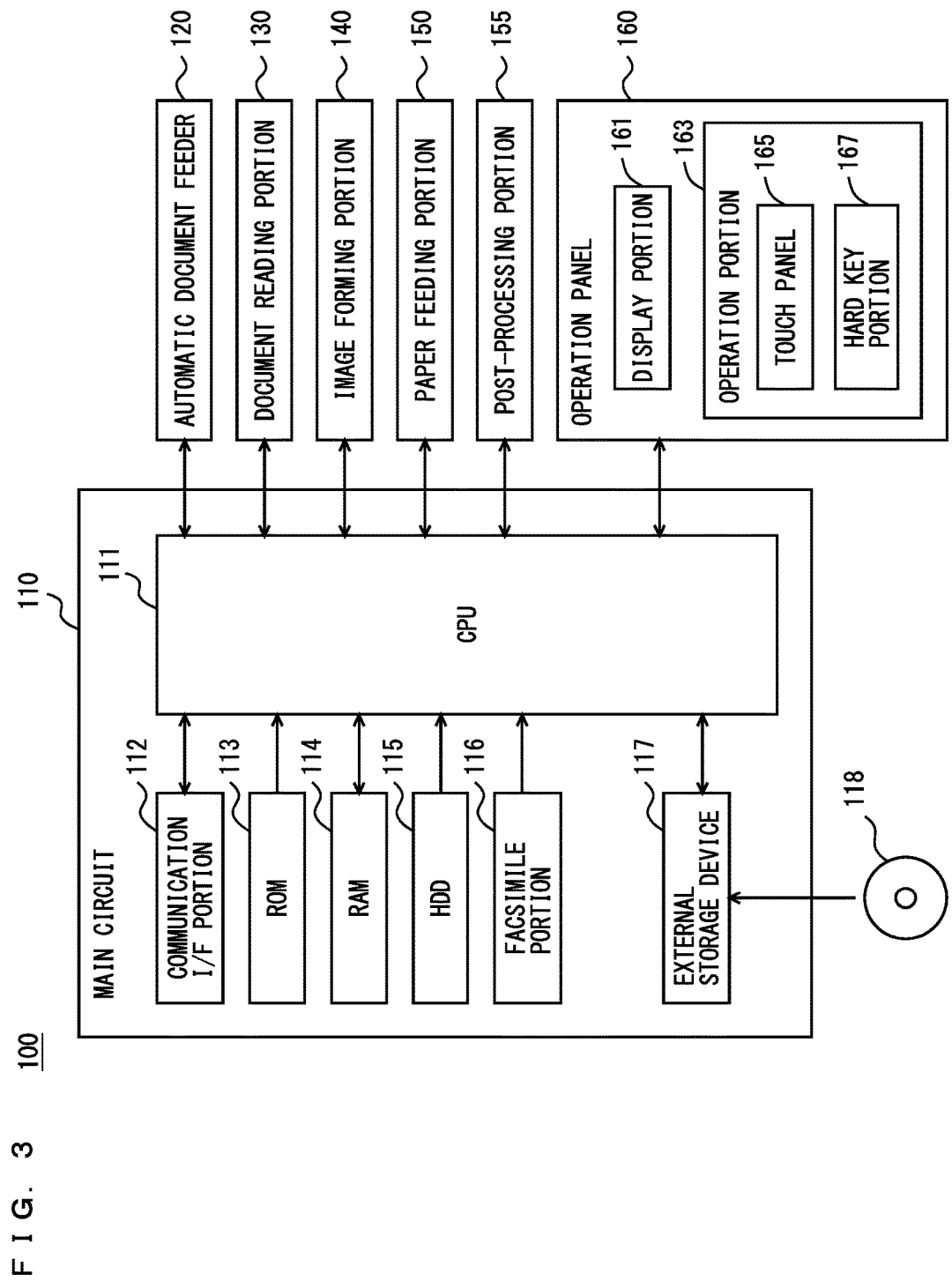
FIG. 3 is a block diagram schematically showing an exemplary hardware configuration of an MFP.

FIG. 3 is a block diagram schematically showing an exemplary hardware configuration of the MFP. Referring to FIG. 3, MFP 100 includes: a main circuit 110; a document reading portion 130 which reads a document; an automatic document feeder 120 which feeds a document to document reading portion 130; an image forming portion 140 which forms an image on a sheet of paper or the like on the basis of image data output from document reading portion 130 that has read a document; a paper feeding portion 150 which supplies sheets of paper to image forming portion 140; a post-processing portion 155 which processes sheets of paper on which images have been formed; and an operation panel 160 serving as a user interface.

Post-processing portion 155 performs a sorting process of sorting and discharging one or more sheets of paper on which images have been formed by image forming portion 140, a hole-punching process of punching the sheets, and a stapling process of stapling the sheets.

Main circuit 110 includes a CPU 111, a communication interface (I/F) portion 112, a ROM 113, a RAM 114, a hard disk drive (HDD) 115 as a mass storage, a facsimile portion 116, and an external storage device 117 on which a CD-ROM 118 is mounted. CPU 111 is connected with automatic document feeder 120, document reading portion 130, image forming portion 140, paper feeding portion 150, post-processing portion 155, and operation panel 160, and is responsible for overall control of MFP 100.

ROM 113 stores a program executed by CPU 111 or data necessary for execution of the program. RAM 114 is used as a work area when CPU 111 executes a program. Further, RAM 114 temporarily stores read data (image data) continuously transmitted from document reading portion 130.

Operation panel 160, which is provided on an upper surface of MFP 100, includes a display portion 161 and an operation portion 163. Display portion 161 is a display such as a liquid crystal display (LCD) or an organic electroluminescence display (ELD), and displays an instruction menu for the user, information about acquired image data, and others. Operation portion 163 includes a hard key portion 167 having a plurality of keys, and accepts input data, such as instructions, characters, and numerical characters, according to the key operations by the user. Operation portion 163 further includes a touch panel 165 disposed on display portion 161.

Communication I/F portion 112 is an interface for connecting MFP 100 to LAN 3. CPU 111 communicates with a device which is connected to LAN 3, via communication I/F portion 112 for data transmission/reception. Further, communication I/F portion 112 is able to communicate with a computer connected to the Internet, such as cloud server 400, via gateway device 200.

Facsimile portion 116 is connected to public switched telephone networks (PSTN), and transmits facsimile data to or receives facsimile data from the PSTN. Facsimile portion 116 stores the received facsimile data into HDD 115, or outputs the data to image forming portion 140. Image forming portion 140 prints on a sheet of paper the facsimile data received by facsimile portion 116. Further, facsimile portion 116 converts the data stored in HDD 115 to facsimile data, and transmits the facsimile data to a facsimile machine connected to the PSTN.

External storage device 117 is mounted with CD-ROM (compact Disk ROM) 118. CPU 111 is capable of accessing CD-ROM 118 via external storage device 117. CPU 111 loads the program stored in CD-ROM 118 which is mounted on external storage device 117, into RAM 114 for execution. It is noted that the medium for storing the program executed by CPU 111 is not restricted to CD-ROM 118. It may be an optical disc (an MO disc, an MD, or a DVD), an IC card, an optical card, or a semiconductor memory such as a mask ROM, an EPROM, an EEPROM, or the like.

Further, CPU 111 may load a program stored in HDD 115, into RAM 114 for execution. In this case, another computer connected to LAN 3 or Internet 5 may rewrite the program stored in HDD 115 of MFP 100, or may additionally write a new program therein. Further, MFP 100 may download a program from another computer connected to LAN 3 or Internet 5, and store the program in HDD 115. As used herein, the "program" includes, not only the program which CPU 111 can execute directly, but also a source program, a compressed program, an encrypted program, and others.

Figure 4:
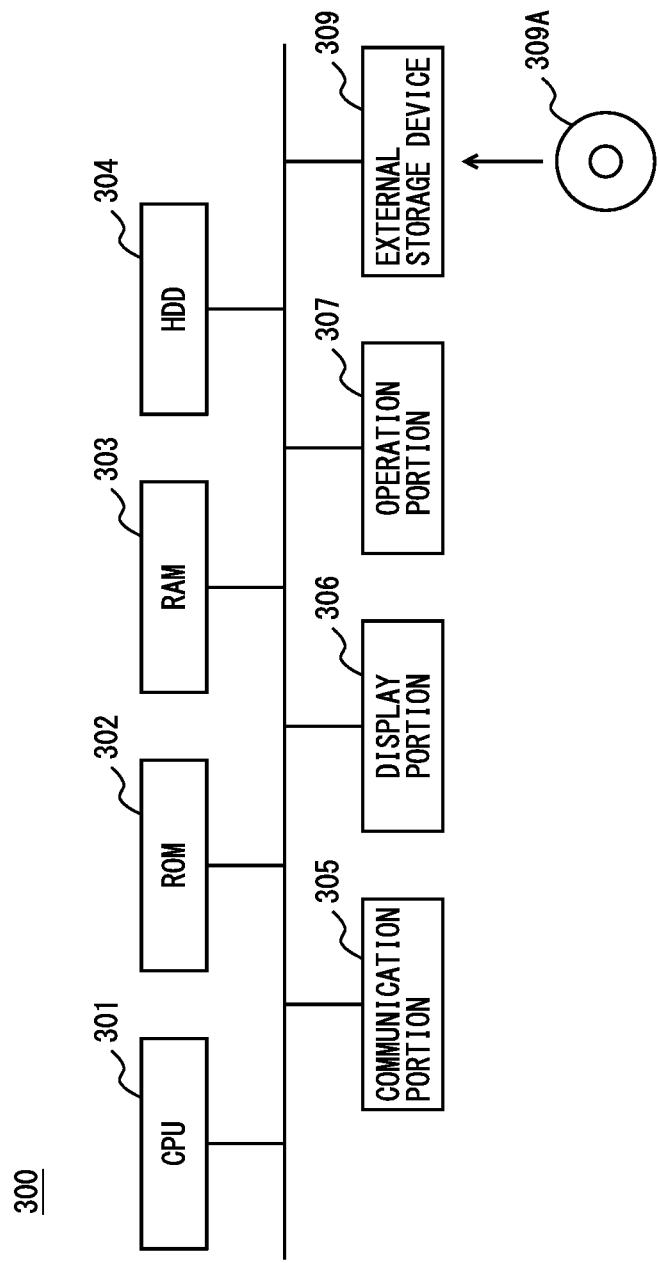
FIG. 4 is a block diagram schematically showing an exemplary hardware configuration of a management server according to the present embodiment.

FIG. 4 is a block diagram schematically showing an exemplary hardware configuration of a management server according to the present embodiment. Referring to FIG. 4, management server 300 includes: a CPU 301 which is responsible for overall control of management server 300; a ROM 302 for storing, among others, a program to be executed by CPU 301; a RAM 303 used as a work area for CPU 301; a HDD 304 which stores data in a non-volatile manner; a communication portion 305 which connects CPU 301 to Internet 5; a display portion 306 which displays information; an operation portion 307 which accepts operations by a user; and an external storage device 309.

External storage device 309 is mounted with a CD-ROM 309A. CPU 301 is capable of accessing CD-ROM 309A via external storage device 309. CPU 301 loads a program stored in CD-ROM 309A which is mounted on external storage device 309, into RAM 303 for execution. It is noted that the medium for storing the program executed by CPU 301 is not restricted to CD-ROM 309A. It may be an optical disc, an IC card, an optical card, or a semiconductor memory such as a mask ROM, an EPROM, an EEPROM, or the like.

Further, the program executed by CPU 301 is not restricted to the program stored in CD-ROM 309A; a program stored in HDD 304 may be loaded into RAM 303 for execution. In this case, another computer connected to Internet 5 may rewrite the program stored in HDD 304 of management server 300, or may additionally write a new program therein. Further, management server 300 may download a program from another computer connected to Internet 5, and store the program in HDD 304. As used herein, the "program" includes, not only the program which CPU 301 can execute directly, but also a source program, a compressed program, an encrypted program, and others.

In connection control system 1 according to the present embodiment, it is possible that management server 300 connected to Internet 5 outside the firewall controls any one of MFPs 100, 100A, and 100 B connected to LAN 3 inside the firewall. As gateway device 200 is located inside the firewall and management server 300 is located outside the firewall, a communication session passing through the firewall is established. This communication session will be hereinafter referred to as an "always-on session". Here, a relationship between management server 300, and MFPs 100, 100A and 100B under the management of Company A will be described in detail. Since the cloud of management server 300 is managed by Company A, management server 300 registers gateway device 200 in order to establish the always-session with gateway device 200. Specifically, authentication information which associates device identification information of gateway device 200 with an authentication key is stored in management server 300, and this allows an access from gateway device 200 to management server 300. Gateway device 200 stores cloud connection information in advance in order to establish the always-on session with management server 300.

FIG. 5 shows an example of cloud connection information. Referring to FIG. 5, the cloud connection information includes an item of assigned ID, an item of assigned cloud ID and an item of authentication key. Information for specifying gateway device 200 is set in the item of assigned ID. Here, "Company A G/W ID" as the information for specifying gateway device 200 to be used by Company A is set. Cloud identification information for specifying a cloud to be used by Company A is set in the item of assigned cloud ID. Here, "Company A Cloud ID" as the cloud identification information for specifying a cloud to be used by Company A, which is previously prepared in management server 300, is set. Here, the cloud identification information for specifying a cloud to be used by Company A is the same as cloud identification information in management server 300. The cloud identification information of management server 300 is a network address, a uniform resource locator (URL) as used herein. A password corresponding to the cloud identification information is set in the item of authentication key. Here, "key-1" as the password corresponding to "Company A Cloud ID" as the cloud identification information is set.

Management server 300 stores authentication information in which "key-1" as the password is designated to correspond to "Company A G/W ID" as the assigned ID, receives "Company A G/W ID" as the assigned ID and "key-1" as the password from gateway device 200, and thereby authenticates gateway device 200.

In order to allow management server 300 to access MFPs 100, 100A, and 100B connected to LAN 3, gateway device 200 establishes the always-on session with management server 300. Gateway device 200 establishes the always-on session with management server 300 specified by the cloud identification information set in the item of assigned cloud ID included in the cloud connection information. At a prescribed timing, for example, when the power of gateway device 200 is turned on, gateway device 200 transmits a communication session establishment request to management server 300. Since gateway device 200 is disposed inside the firewall and management server is disposed outside the firewall, the always-on session is established as a communication session passing through the firewall. At this time, gateway device 200 is authenticated by management server 300 by transmitting "key-1" as the password included in the cloud connection information, and gateway device 200 is connected to the cloud which is located in management server 300 and specified by the cloud identification information "Company A Cloud ID".

After establishing the always-on session with management server 300, gateway device 200 transmits via the always-on session to management server 300 device identification information for identifying each of MFPs 100, 100A and 100B connected to LAN 3. This allows management server 300 to recognize MFPs 100, 100A and 100B connected to gateway device 200. For example, management server stores in HDD 304 always-on session information associating gateway device 200 with each of MFPs 100, 100A and 100B.

FIG. 6 shows an example of the always-on session information. Referring to FIG. 6, the always-on session information includes an item of gateway and an item of control target device. "Company A G/W ID" as the device identification information for identifying gateway device 200 to which the always-on session is established is set in the item of gateway. The device identification information of gateway device 200 is a network address assigned to gateway device 200 in Internet 5. The device identification information of a control target device connected to gateway device 200 is set in the item of control target device. Here, since the control target devices connected to gateway device 200 are MFPs 100, 100A and 100B, the always-on session information associates "MFP-1", "MFP-2" and "MFP-3" as the device identification information of each of MFPs 100, 100A and 100B, respectively with "Company A G/W ID" as the device identification information for identifying gateway device 200. The device identification information of each of MFPs 100, 100A and 100B is a network address assigned to each of MFPs 100, 100A and 100B in LAN 3.

Connection control system 1 according to the present embodiment further allows cloud server 400 connected to Internet 5 outside the firewall to control any one of MFPs 100, 100A and 100B connected to LAN 3 inside the firewall. In order to describe in detail, it is here assumed, by way of example, that Company A allows a member of Company B to use MFP 100. In this case, a common setting is performed in connection control system 1 in order to allow the member of Company B to use MFP 100. The common setting includes a setting for storing prescribed information in each of MFP 100, management server 300, and cloud server 400.

MFP 100 registers the member of Company B. In this case, it is cumbersome to register all of a plurality of members of Company B, and it is not necessary to manage user IDs of the plurality of member of Company B under the management of Company A. Thus, a user ID and a password of a representative user who represents the members of Company B are registered in MFP 100. The user ID of the representative user who represents the members of Company B will be hereinafter referred to as "Company B User ID". It is noted here that, if MFP 100 has a function of permitting a group having a plurality of users to log in, a group which is assigned to Company B may be registered on behalf of "Company B User ID" as the user ID of the representative user. Here, the group includes one or more user IDs, and is assigned with group identification information for identifying a group. In an authentication process and a process for restricting authorization for use, MFP 100 treats the group identification information in the same manner as the user identification information. In the case where a group assigned to Company B is registered, the group assigned to Company B is a group which does not include a user ID.

When the member of Company B uses MFP 100, in order to allow a tunnel connection between cloud server 400 of Company B and MFP 100, for-loan association information is registered in management server 300. The for-loan association information associates cloud identification information for identifying a cloud to be used by Company B, address information of MFP 100, and Company B User ID, with each other. The address information of MFP 100 includes device identification information of MFP 100 and device identification information of a gateway device. Here, the cloud to be used by Company B is a cloud included in cloud server 400. Further, the cloud identification information of the cloud to be used by Company B is referred to as the cloud identification information of cloud server 400.

FIG. 7 shows an example of for-loan association information. The for-loan association information includes an item of device address information, an item of user ID and an item of shared destination cloud ID. Address information of a control target device to be loaned to another company is set in the item of device address information. The address information of a control target device includes device identification information of a gateway device to which the control target device is connected, and device identification information of the control target device. Here, since MFP 100 is loaned to Company B, "Company A G/W ID" as the device identification information of gateway device 200 to which MFP 100 is connected, and "MFP-1" as the device identification information of MFP 100 are set. "Company B User ID" as the user ID of the representative user who represents the members of Company B is set in the item of user ID. The cloud identification information for identifying a cloud to be used by Company B to which MFP 100 is loaned is set in the item of shared destination cloud ID. Here, since the cloud to be used by Company B is a cloud included in cloud server 400, "Company B Cloud ID" as the cloud identification information of the cloud included in cloud server 400 is set.

When the member of Company B uses MFP 100, in order to allow a tunnel connection between cloud server 400 of Company B and MFP 100, for-borrowing association information is registered in cloud server 400. The for-borrowing association information associates address information of a control target device with cloud identification information corresponding to a user who manages the control target device. Here, the for-borrowing association information associates the address information of MFP 100 with the cloud identification information of a cloud of management server 300.

FIG. 8 shows an example of for-borrowing association information. The for-borrowing association information includes an item of device address information and an item of shared source cloud ID. Here, since MFP 100 is loaned to Company B, "Company A G/W ID" as the device identification information of gateway device 200 to which MFP 100 is connected, and "MFP-1" as the device identification information of MFP 100 are set in the item of device address information. The cloud identification information for identifying a cloud of Company A having the control target device is set in the item of shared source cloud ID. Here, "Company A Cloud ID" as the cloud identification information of the cloud of management server 300 is set.

At first, it is here assumed, by way of example, that cloud server 400 controls MFP 100 connected to LAN 3 inside the firewall. MFP 100 is a control target device which is targeted to be controlled by cloud server 400. Cloud server 400 is accessed from a personal computer (hereinafter, referred to as "PC") connected to LAN 3 inside the firewall and executes a process for providing a service in accordance with an instruction from a user who operates the PC. In other cases, cloud server 400 is accessed from a PC connected to Internet 5 outside the firewall and executes a process for providing a service in accordance with an instruction from the user who operates the PC.

It is here assumed, by way of example, that cloud server 400 executes, in accordance with an instruction from the member of Company B who has logged therein, a process based on a service provided thereby and causes MFP 100 to execute a process on the resultant data. In this case, cloud server 400 transmits to MFP 100 a job for causing MFP 100 to execute the process. As MFP 100 is disposed inside the firewall, the job transmitted by server 400 is to pass through the firewall. In order to allow the job to pass through the firewall, a tunnel connection is to be established between cloud server 400 and MFP 100. While there are a variety of techniques and methods for establishing a tunnel connection, it is here assumed that gateway device 200 establishes the always-on session with management server 300, and with support from management server 300, gateway device 200 establishes the tunnel connection by relaying communications between cloud server 400 and MFP 100.

Figure 9:
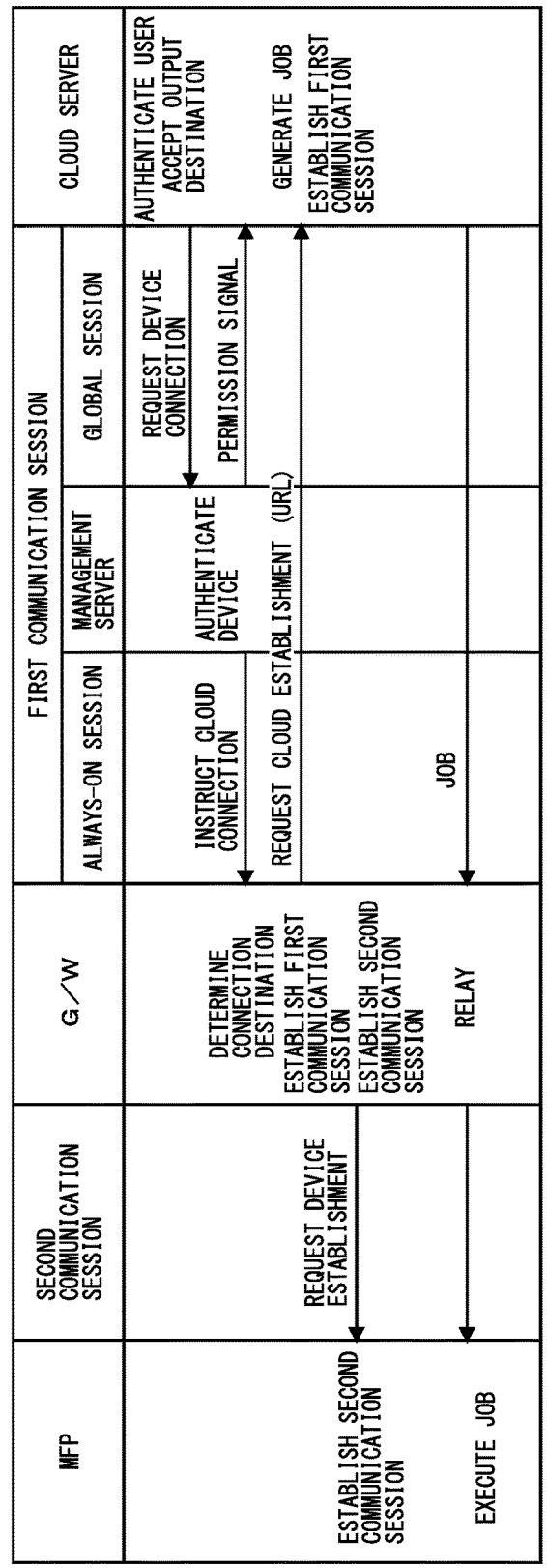
FIG. 9 is a flowchart illustrating an exemplary flow of a process wherein a cloud server accesses an MFP disposed inside a firewall.

FIG. 9 is a flowchart illustrating an exemplary flow of a process wherein cloud server 400 accesses MFP 100 disposed inside the firewall. Referring to FIG. 9, cloud server 400 authenticates a user. Only a user who is registered in advance in cloud server 400 is authenticated and able to log in. Here, since the member of Company B is registered in cloud server 400, only the member of Company B is able to log in. The user who has logged in cloud server 400 receives a service provided by cloud server 400. It is here assumed that cloud server 400 has a function of a file server and provides a service of storing data.

When a user designates data stored in cloud server 400 and inputs into cloud server 400 an instruction to print out the data, cloud server 400 provides a list of selectable devices capable of printing out. In a common setting, cloud server is set to store the for-borrowing association information as shown in FIG. 8. Therefore, cloud server 400 provides the user with a list of selectable pieces of address information included in the for-borrowing association information. In the case where the user selects from the list a piece of address information of MFP 100 specified by "MFP-1" as the device identification information and "Company A G/W ID" as the gateway identification information, cloud server 400 transmits a device connection request to management server 300 specified by "Company A Cloud ID" as the cloud identification information which is associated with the address information of MFP 100 by the for-borrowing association information. The device connection request includes the address information of MFP 100 and waiting address information of cloud server 400. The waiting address information of cloud server 400 is a URL used by gateway device 200 (MFP 100 as a control target device) to access cloud server 400. In a URL, for example as in "https://www.example.com/print_service?job_id=j00123:60001", an address (domain name) as the device identification information of cloud server 400, a Web page identifier, an identifier (job ID) of the job executed by cloud server 400, and a listening port number are included. As the listening port, an unused one of the ports within a prescribed range is used. Further, a unique ID is issued as the job ID. The job executed by cloud server 400 is a job which corresponds to a service that the user who is operating cloud server 400 has designated from among the services provided by cloud server 400. Since the URL as the waiting address information of cloud server 400 includes the job ID, it is possible to associate a device that has accessed the URL with a job that is specified by the job ID. In other words, it is possible to associate the job that corresponds to a process providing the service designated by the user who is operating cloud server 400, with the control target device, which is MFP 100 here.

When management server 300 receives the device connection request, management server 300 performs device authentication. The device authentication is a process which determines that MFP 100 specified by the device connection request and cloud server 400 are commonly set. If management server 300 stores the for-loan association information which includes the address information of MFP 100 and the device identification information of cloud server 400 included in the device connection request, management server 300 determines that MFP 100 and cloud server 400 are commonly set. If so, management server outputs a permission signal to cloud server 400. The permission signal includes "Company B User ID" as the user identification information which is set in the item of user ID of the for-loan association information including the address information of MFP 100 and the cloud identification information of cloud server 400.

Further, when management server 300 receives the device connection request, management server 300 transmits a cloud connection instruction to gateway device 200 specified by the gateway identification information included in the address information of MFP 100 included in the device connection request. The cloud connection instruction includes the device identification information of MFP 100 and the waiting address information of cloud server 400 included in the device connection request.

Gateway device 200 receives the cloud connection instruction and determines a connection destination. Here, gateway device 200 determines cloud server 400 as a first connection destination from the waiting address information of cloud server 400 included in the cloud connection instruction, and determines MFP 100 as a second connection destination from the device identification information of MFP 100 included in the cloud connection instruction. Then, gateway device 200 transmits a cloud establishment request to cloud server 400 determined as the first connection destination, and establishes a first communication session with cloud server 400. The cloud establishment request includes "MFP-1" as the device identification information for identifying MFP 100. When cloud server 400 receives the cloud establishment request from gateway device 200, cloud server 400 refers to the for-borrowing association information shown in FIG. 8, and establishes the first communication session with gateway device 200 on the condition that a pair of MFP 100 specified by "MFP-1" as the device identification information included in the cloud establishment request, and "Company A G/W ID" as the gateway identification information of gateway device 200 having transmitted the cloud establishment request, is registered.

Further, gateway device 200 transmits a device establishment request to MFP 100 determined as the second connection destination, and establishes a second communication session with MFP 100. Then, gateway device 200 relays communications between cloud server 400 and MFP 100, using the first communication session and the second communication session. This completes a tunnel connection between management server 300 and MFP 100.

Cloud server 400 generates a job and transmits the job to gateway device 200 via the first communication session. Upon generation of the job by cloud server 400, "Company B User ID" as the user identification information included in the permission signal is included in the job. Gateway device 200 transmits the job received via the first communication session to MFP 100, via the second communication session. MFP 100 executes the received job. Since the job generated by cloud server 400 includes "Company B User ID" as the user identification information, MFP 100 is able to specify a user who has instructed an execution of the job as the member of Company B. If MFP 100 restricts a process executable for "Company B User ID", MFP 100 is able to execute a job only in the case where an execution of the job is not restricted.

Figure 10:
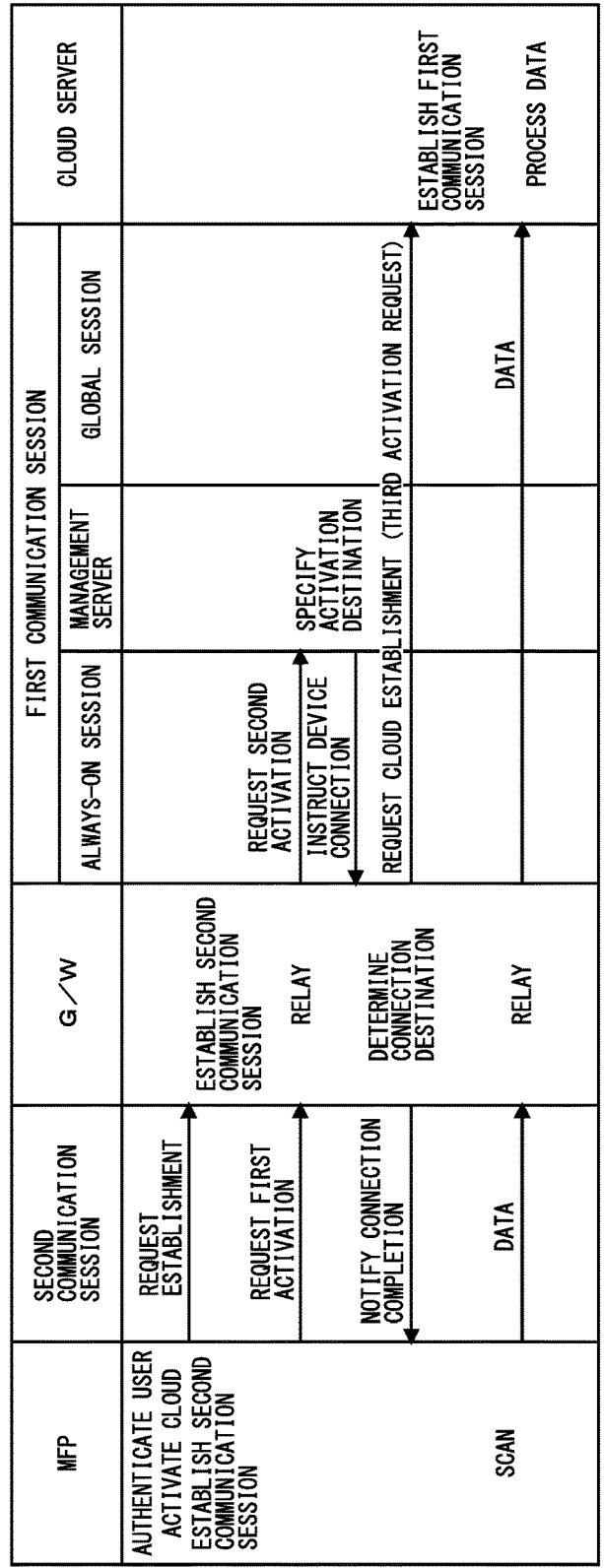
FIG. 10 is a flowchart illustrating an exemplary flow of a process wherein the MFP disposed inside the firewall accesses the management server.

FIG. 10 is a flowchart illustrating an exemplary flow of a process where MFP 100 disposed inside a firewall accesses management server 300. It is here assumed, by way of example, that data of a document read by MFP 100 is stored in cloud server 400 which functions as a file server. Referring to FIG. 10, MFP 100 authenticates a user. Only a user who is registered in advance in MFP 100 is able to log in. Here, since "Company B User ID" as the user identification information of the representative user who represents the members of Company B is registered in MFP 100, it is assumed, by way of example, that the member of Company B uses "Company B User ID" as the user identification information to log in.

When a user inputs to MFP 100 an operation of activating a cloud, MFP 100 transmits an establishment request of communication session to gateway device 200, and establishes a communication session with gateway device 200. Here, the communication session established between gateway device 200 and MFP 100 is a second communication session.

Next, MFP 100 transmits a first activation request of activating a cloud to gateway device 200. The first activation request includes "Company B User ID" as the user identification information of the representative user of Company B as a logged in user. When gateway device 200 receives the first activation request from MFP 100, gateway device 200 transmits a second activation request to management server 300 via the always-on session. The second activation request includes "MFP-1" as the device identification information of MFP 100 which has transmitted the first activation request, and "Company B User ID" as the user identification information included in the first activation request.

When management server 300 receives the second activation request, management server 300 specifies a connection destination. When management server 300 receives the second activation request, management server 300 refers to the for-loan association information, and specifies a cloud. The address information of MFP 100 as a control target device is determined from "Company A G/W ID" as the gateway identification information of gateway device 200 which has transmitted the second activation request, and "MFP-1" as the device identification information of MFP 100 included in the second activation request. Cloud server 400 which has been commonly set with MFP 100 is specified from the address information of MFP 100 and "Company B User ID" as the user identification information included in the second activation request. Specifically, on the basis of the for-loan association information shown in FIG. 7, a pair of "MFP-1" as the device identification information and as the address information of MFP 100 and "Company A G/W ID" as the gateway identification information, and "Company B User ID" as the user identification information included in the second activation request, is associated with "Company B Cloud ID" as the cloud identification information. Therefore, management server 300 specifies as an activation destination cloud server 400 identified by "Company B Cloud ID" as the cloud identification information.

Then, management server 300 transmits a device connection instruction via the always-on session to gateway device 200 which has transmitted the second activation request. The device connection instruction includes "MFP-1" as the device identification information of MFP 100, and "Company B Cloud ID" as the cloud identification information of cloud server 400 specified as the activation destination. In this case, the device connection instruction is encapsulated, for transmission, in accordance with the protocol corresponding to the always-on session.

When gateway device 200 receives the device connection instruction from management server 300, gateway device 200 determines a connection destination. Here, gateway device 200 determines cloud server 400 as a first connection destination from "Company B Cloud ID" as the cloud identification information included in the device connection instruction, and determines MFP 100 as a second connection destination from "MFP-1" as the device identification information included in the device connection instruction. Then, gateway device 200 transmits a cloud establishment request to cloud server 400 determined as the first connection destination, and establishes a first communication session with cloud server 400. The cloud establishment request includes "MFP-1" as the device identification information included in the device connection instruction. When cloud server 400 receives the cloud establishment request from gateway device 200, cloud server 400 refers to the for-borrowing association information shown in FIG. 8, and establishes the first communication session with gateway device 200 on the condition that a pair of "MFP-1" as the device identification information included in the cloud establishment request, and "Company A G/W ID" as the gateway identification information of gateway device 200 having transmitted the cloud establishment request, is registered.

Further, since the second communication session with MFP 100 determined as the second connection destination is established, gateway device 200 transmits a connection completion notification via the second communication session. Then, gateway device 200 relays communications between cloud server 400 and MFP 100, using the first communication session and the second communication session. This completes the tunnel connection between management server 300 and MFP 100.

When a user, who has logged in MFP 100, using "Company B User ID" as the user identification information, inputs to operation panel 160 an instruction of scanning a document, MFP 100 transmits data acquired from the read document to gateway device 200 via the second communication session. Since gateway device 200 transmits data received from MFP 100 to cloud server 400 via the first communication session, the data is received by cloud server 400 and a process is executed for the data. Here, cloud server 400 executes a process of storing the received data on a predetermined position.

It should be noted that the tunnel connection method is not limited to the above-described method; another method may be used as well. For example, management server 300 may relay a communication between cloud server 400 and MFP 100, as with gateway device 200. For example, gateway device 200 may establish always-on sessions with management server 300 for the respective MFPs 100, 100A, and 100B, and management server 300 may connect the global session, established between management server 300 and cloud server 400, with the always-on session corresponding to MFP 100 that has been designated by the user of cloud server 400, to thereby relay a communication between cloud server 400 and MFP 100. In this case, cloud server 400 only needs to transmit the address information of MFP 100; it does not have to transmit the address information of cloud server 400. The load on management server 300, however, increases because it executes the relay process.

Figure 11:
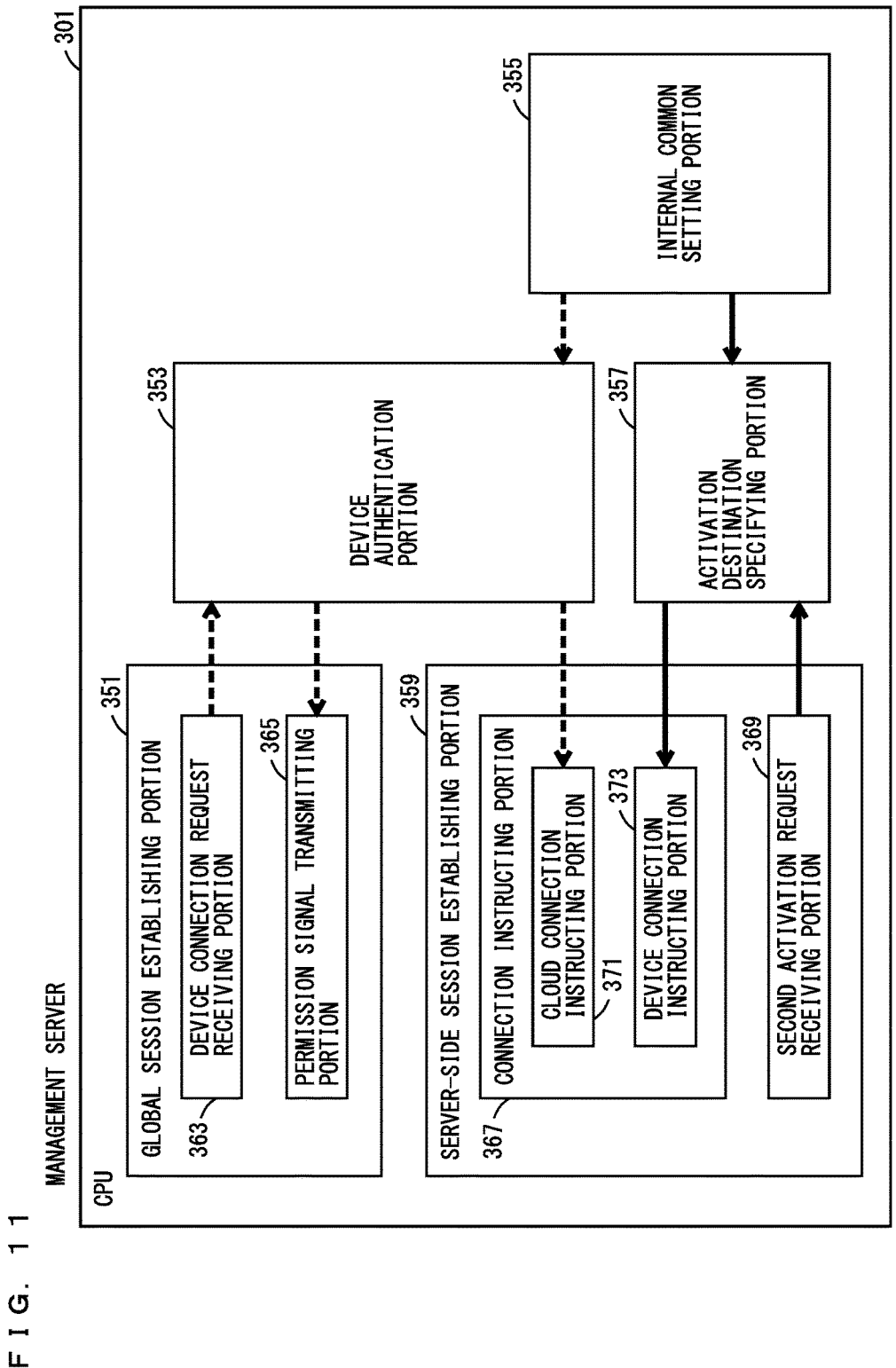
FIG. 11 is a block diagram showing, by way of example, the functions of a CPU included in the management server.

FIG. 11 is a block diagram showing, by way of example, the functions of a CPU included in the management server. It is noted that in the figure, a flow of information in the case where the management server is accessed from cloud server 400 is shown by dotted arrows, and a flow of information in the case where the management server is accessed from MFP 100 is shown by bold arrows. The functions shown in FIG. 11 are formed in CPU 301 included in management server 300 as CPU 301 executes a connection support program stored in ROM 302, HDD 304, or CD-ROM 309A. Referring to FIG. 11, CPU 301 included in management server 300 includes a global session establishing portion 351, a device authentication portion 353, an internal common setting portion 355, an activation destination specifying portion 357, and a server-side session establishing portion 359.

Server-side session establishing portion 359 controls communication portion 305 to establish a communication session with gateway device 200. The communication session established here is the always-on session. Server-side session establishing portion 359 establishes the communication session in response to reception of a communication session establishment request from gateway device 200.

Internal common setting portion 355 registers for-loan association information. Internal common setting portion 355 stores in HDD 304 the for-loan association information associating the cloud identification information for identifying a cloud to be used by Company B to which MFP 100 is loaned, the address information of MFP 100, and the user identification information of the representative user who represents the members of Company B, with each other. Here, for registering in MFP 100 "Company B User ID" as the user identification information of the representative user who represents the members of Company B, in addition, an administrator of MFP 100 inputs to MFP 100 the cloud identification information for identifying a cloud to be used by Company B, "Company B Cloud ID" as the cloud identification information of cloud server 400 as used herein. Then, MFP 100 transmits to gateway device 200 a pair of "Company B User ID" as the user identification information, and "Company B Cloud ID" as the cloud identification information. Gateway device 200 transmits to management server 300 "Company B User ID" as the user identification information, "Company B Cloud ID" as the cloud identification information, and the address information of MFP 100. Internal common setting portion 355 generates to store in HDD 304 the for-loan association information which includes "Company B User ID" as the user identification information, "Company B Cloud ID" as the cloud identification information, and the address information of MFP 100. Thus, the for-loan association information shown in FIG. 7 is stored in HDD 304.

Global session establishing portion 351 controls communication portion 305 to establish a communication session with a computer located outside the firewall. Here, it is assumed that a communication session is established between management server 300 and cloud server 400. The communication session established here is the global session. Global session establishing portion 351 controls communication portion 305, and establishes the global session with cloud server 400 in response to reception of a communication session establishment request from cloud server 400. Global session establishing portion 351 includes a device connection request receiving portion 363, and a permission signal transmitting portion 365.

Device connection request receiving portion 363 receives a device connection request from cloud server 400. The device connection request includes the address information of MFP 100, and the waiting address information of cloud sever 400. Device connection request receiving portion 363, in response to reception of the device connection request, outputs to device authentication portion 353 the address information of MFP 100 and the waiting address information of cloud server 400 included in the device connection request. The waiting address information of cloud server 400 will be described in detail later, briefly, the waiting address information of cloud server 400 includes the cloud identification information of cloud server 400.

Device authentication portion 353, on the basis of the address information of MFP 100 and the waiting address information of cloud server 400 which are input from device connection request receiving portion 363, specifies MFP 100 and cloud server 400, and determines whether or not MFP 100 is commonly set with cloud server 400. Specifically, device authentication portion 353 determines whether or not internal common setting portion 355 stores in HDD 304 the for-loan association information including the device identification information of gateway device 200 and the device identification information of MFP 100 included in the address information of MFP 100, and the cloud identification information of cloud server 400. If such for-loan association information is stored in HDD 304, device authentication portion 353 determines that MFP 100 is commonly set with cloud server 400, and reads out the for-loan association information from HDD 304. In the case where device authentication portion 353 determines that MFP 100 is commonly set with cloud server 400, device authentication portion 353 outputs a permission signal to permission signal transmitting portion 365, and outputs to server-side session establishing portion 359 a cloud connection instruction. The permission signal includes "Company B User ID" as the user identification information included in the read for-loan association information. The cloud connection instruction includes the waiting address information of cloud server 400 and the address information of MFP 100.

Permission signal transmitting portion 365, in response to input of the permission signal from device authentication portion 353, transmits the permission signal via the global session to cloud server 400 which has transmitted the device connection request.

Server-side session establishing portion 359 controls communication portion 305 to establish a communication session with gateway device 200 disposed inside the firewall. In response to an event that communication portion 305 receives the communication session establishment request from gateway device 200, server-side session establishing portion 359 establishes the communication session with gateway device 200. The communication session with gateway device 200 established by management server 300 is the always-on session.

Server-side session establishing portion 359 includes a connection instructing portion 367 and a second activation request receiving portion 369. Connection instructing portion 367 includes a cloud connection instructing portion 371 and a device connection instructing portion 373. Cloud connection instructing portion 371, in response to input of a cloud connection instruction from device authentication portion 353, on the basis of the device identification information of gateway 200 included in the address information of MFP 100 included in the cloud connection instruction, specifies the always-on session established between gateway device 200. Further, cloud connection instructing portion 371 transmits the cloud connection instruction to gateway device 200 via the specified always-on session. The cloud connection instruction includes the waiting address information of cloud server 400 and the device identification information of MFP 100.

Second activation request receiving portion 369, in response to reception of a second activation request from gateway device 200 via the always-on session, outputs to activation destination specifying portion 357 the second activation request, and the device identification information of gateway device 200 which has transmitted the second activation request. It is here assumed, by way of example, that the second activation request includes "MFP-1" as the device identification information of MFP 100 and "Company B User ID" as the user identification information of a user who has logged in MFP 100.

Activation destination specifying portion 357 specifies as an activation destination a cloud which is commonly set with MFP 100 specified by "MFP-1" as the device identification information included in the second activation request. Specifically, activation destination specifying portion 357 determines whether or not internal common setting portion 355 stores in HDD 304, from among a plurality of pieces of the for-loan association information stored in HDD 304 by internal common setting portion 333, the for-loan association information including "Company A G/W ID" as the device identification information of gateway device 200 which has transmitted the second activation request, "MFP-1" as the device identification information of MFP 100 included in the second activation request, and "Company B User ID" as the user identification information. If such for-loan association information is stored in HDD 304, activation destination specifying portion 357 reads out the for-loan association information from HDD 304, and specifies cloud server 400 from "Company B Cloud ID" as the cloud identification information included in the for-loan association information. In the case where activation destination specifying portion 357 specifies cloud server 400, activation destination specifying portion 357 outputs to device connection instructing portion 373 "Company B Cloud ID" as the cloud identification information of cloud server 400 specified as the activation destination, "Company A G/W ID" as the device identification information of gateway device 200 which has transmitted the second activation request, and "MFP-1" as the device identification information of MFP 100 included in the second activation request.

Device connection instructing portion 373 specifies the always-on session established between gateway device 200 on the basis of "Company A G/W ID" as the device identification information of gateway device 200 being input from activation destination specifying portion 357. Further, device connection instructing portion 373 transmits the device connection instruction to gateway device 200 via the specified always-on session. The device connection instruction includes the cloud destination information of cloud server 400 and the device identification information of MFP 100 being input from activation destination specifying portion 357.

Figure 12:
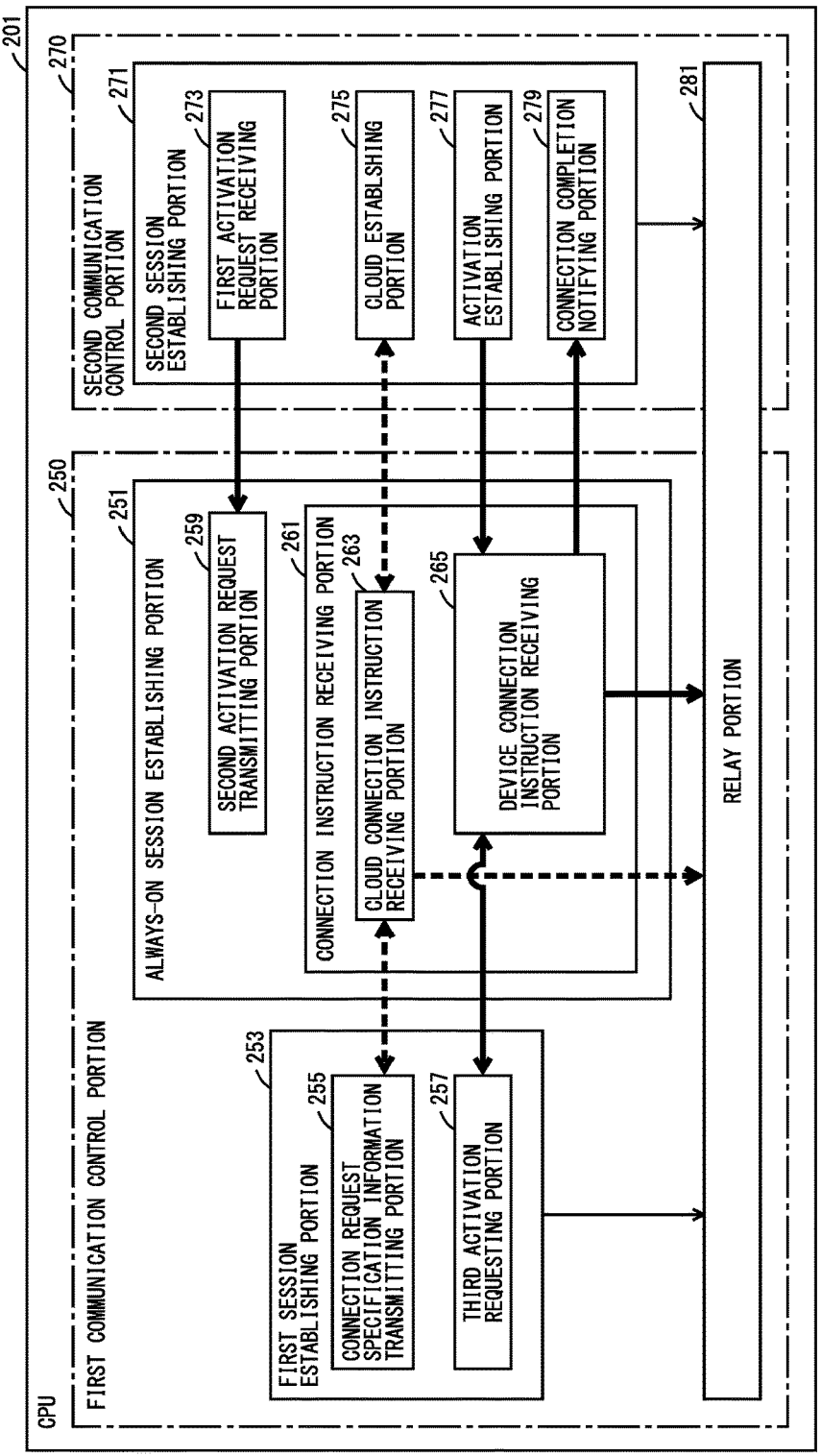
FIG. 12 is a block diagram showing, by way of example, the functions of a CPU included in the gateway device.

FIG. 12 is a block diagram showing, by way of example, the functions of a CPU included in the gateway device. It is noted that in the figure, a flow of information in the case where the gateway device is accessed from cloud server 400 is shown by dotted arrows, and a flow of information in the case where the gateway device is accessed from MFP 100 is shown by bold arrows. The functions shown in FIG. 12 are formed in CPU 201 included in gateway device 200 as CPU 201 executes a relay program stored in ROM 202, flash memory 204, or CD-ROM 209A. Referring to FIG. 12, CPU 201 included in gateway device 200 includes: an always-on session establishing portion 251, a first session establishing portion 253, a second session establishing portion 271, and a relay portion 281.

CPU 201 further includes a first communication control portion 250 and a second communication control portion 270. First communication control portion 250 controls first communication portion 205 so as to control a communication with a computer connected to Internet 5. First communication control portion 250 includes always-on session establishing portion 251, first session establishing portion 253, and part of relay portion 281. Second communication control portion 270 controls second communication portion 206 so as to control a communication with each of MFPs 100, 100A, and 100B connected to LAN 3. Second communication control portion 270 includes a second session establishing portion 271 and part of relay portion 281.

Always-on session establishing portion 251 controls first communication portion 205 to transmit a communication session establishment request to management server 300, and establishes a communication session with management server 300. The communication session established here is the always-on session which is connected constantly. The always-on session is not particularly limited, but it may be, for example, a message session based on extensible messaging and presence protocol (XMPP). Always-on session establishing portion 251 specifies management server 300 specified by "Company A Cloud ID" as the cloud identification information which is set in the item of assigned cloud ID of the cloud connection information shown in FIG. 5. Next, always-on session establishing portion 251 controls first communication portion 205 to transmit a communication session establishment request to management server 300, and performs with management server 300 prescribed negotiations including transmission of "key-1" as a password and the like, to thereby establish the always-on session. Always-on session establishing portion 251 establishes the always-on session at a prescribed timing. The prescribed timing may be determined arbitrarily; it may be, for example, the time when gateway device 200 has been turned on, or a predetermined time.

Further, always-on session establishing portion 251 acquires device information of a device connected to LAN 3 inside the firewall, and transmits the device information to management server 300 via the always-on session. It is here assumed, by way of example, that each of MFPs 100, 100A and 100B is detected as a device connected to LAN 3.

Always-on session establishing portion 251 controls second communication portion 206 so as to acquire device identification information of each of MFPs 100, 100A and 100B which is detected as the device connected to LAN 3. The device identification information is a local IP address, for example. Always-on session establishing portion 251 transmits the acquired device identification information to management server 300 via the always-on session in order to notify management server 300 of the device connected to LAN 3 inside the firewall.

Always-on session establishing portion 251 includes a second activation request transmitting portion 259 and a connection instruction receiving portion 261. Connection instruction receiving portion 261 receives a connection instruction from management server 300 via the always-on session. The connection instruction includes a cloud connection instruction and a device connection instruction. The cloud connection instruction includes waiting address information of cloud server 400 and device identification information of MFP 100. The waiting address information of cloud server 400 is a URL for an access from MFP 100 to cloud server 400, and includes the cloud identification information of cloud server 400. The device connection instruction includes the cloud identification information of cloud server 400 and the device identification information of MFP 100.

Connection instruction receiving portion 261 includes a cloud connection instruction receiving portion 263 and a device connection instruction receiving portion 265. Cloud connection instruction receiving portion 263 receives via the always-on session a cloud connection instruction transmitted by management server 300. Device connection instruction receiving portion 265 receives via the always-on session a device connection instruction transmitted by management server 300.

First session establishing portion 253 controls first communication portion 205 so as to establish a communication session with cloud server 400. The session established by first session establishing portion 253 is a first communication session. When first session establishing portion 253 establishes the first communication session, first session establishing portion 253 outputs to a relay portion 281 session identification information for identifying the first communication session. First session establishing portion 253 includes a connection request specification information transmitting portion 255 and a third activation requesting portion 257.

Second session establishing portion 271 controls second communication portion 206 so as to establish a communication session with MFP 100. The communication session established here is the second communication session. The second communication session is not particularly limited; it only needs to be a communication session conforming to the communication protocol that is used in LAN 3. When second session establishing portion 271 succeeds establishment of the second session, second session establishing portion 271 outputs session identification information for identifying the second communication session, to relay portion 281. Second session establishing portion 271 includes a first activation request receiving portion 273, a cloud establishing portion 275, an activation establishing portion 277 and connection completion notifying portion 279.

Cloud connection instruction receiving portion 263, in response to reception of a cloud connection instruction from management server 300, outputs to connection request specification information transmitting portion 255 the waiting address information of cloud server 400 and the device identification information of MFP 100 included in the cloud connection instruction. Further, cloud connection instruction receiving portion 263 outputs to cloud establishing portion 275 the device identification information of MFP 100 included in the cloud connection instruction.

Connection request specification information transmitting portion 255, in response to an event that the waiting address information of cloud server 400 and the device identification information of MFP 100 are received from cloud connection instruction receiving portion 263, specifies cloud server 400 on the basis of the waiting address information, and establishes a first communication session with cloud server 400. When connection request specification information transmitting portion 255 establishes the first communication session, connection request specification information transmitting portion 255 transmits connection request specification information to cloud server 400 via the first communication session, and outputs session identification information of the first communication session to relay portion 281 and cloud connection instruction receiving portion 263. The connection request specification information includes the waiting address information of cloud server 400 and the device identification information of MFP 100. Since the waiting address information of cloud server 400 is information included in the device connection request transmitted by cloud server 400 to management server 300, the waiting address information of cloud server 400 is information which specifies the device connection request.

Cloud establishing portion 275, in response to input of the address information of MFP 100 from cloud connection instruction receiving portion 263, establishes a second communication session with MFP 100. When cloud establishing portion 275 establishes the second communication session, cloud establishing portion 275 outputs session identification information of the second communication session to relay portion 281 and cloud connection instruction receiving portion 263.

When the session identification information of the first communication session is input from connection request specification information transmitting portion 255, as well as the session identification information of the second communication session is input from cloud establishing portion 275, cloud connection instruction receiving portion 263 outputs a relay instruction including said input information to relay portion 281.

Activation establishing portion 277, in response to an event that second communication portion 206 receives a session establishment request from MFP 100, establishes a second communication session with MFP 100. When activation establishing portion 277 establishes the second communication session, activation establishing portion 277 outputs session identification information for identifying the second communication session to device connection instruction receiving portion 265 and relay portion 281.

First activation request receiving portion 273, in response to reception of a first activation request from MFP 100 via the second communication session, outputs a first activation request to second activation request transmitting portion 259. The first activation request includes "Company B User ID" as the user identification information for identifying a user who operates MFP 100. Second activation request transmitting portion 259, in response to input of the first activation request, transmits a second activation request to management server 300 via the always-on session. The second activation request includes the device identification information of MFP 100 which has transmitted the first activation request, and "Company B User ID" as the user identification information included in the first activation request.

Since management server 300 receiving the second activation request transmits a device connection instruction, device connection instruction receiving portion 265 receives via the always-on session the device connection instruction transmitted by management server 300. After the session identification information for identifying the second communication session is input from activation establishing portion 277, device connection instruction receiving portion 265, in response to reception of the device connection instruction, outputs the cloud identification information of cloud server 400 included in the device connection instruction to third activation requesting portion 257.

Third activation requesting portion 257, in response to input of the cloud identification information of cloud server 400 from device connection instruction receiving portion 265, transmits an establishment request of a communication session to cloud server 400, and establishes a first communication session with cloud server 400. When third activation requesting portion 257 establishes the first communication session, third activation requesting portion 257 outputs session identification information of the first communication session to device connection instruction receiving portion 265 and relay portion 281.

Device connection instruction receiving portion 265, in response to input of the session identification information of the first communication session from third activation requesting portion 257, outputs to relay portion 281 a relay instruction including the session identification information of the first communication session and the session identification information of the second communication session input from activation establishing portion 277, and outputs a completion signal to connection completion notifying portion 279.

Connection completion notifying portion 279, in response to input of the completion signal from device connection instruction receiving portion 265, transmits a connection completion notification via the second communication session to MFP 100 which has transmitted the first activation request.

Relay portion 281, in response to input of a relay instruction from cloud connection instruction receiving portion 263, relays communications between MFP 100 and cloud server 400, using the first communication session and the second communication session specified by two pieces of session identification information included in the relay request. Relaying the communication between cloud server 400 and MFP 100 by relay portion 281 enables data transmission/reception between cloud server 400 and MFP 100. Relay portion 281 associates the first communication session with the second communication session, and transmits data that is received from cloud server 400 via the first communication session, to MFP 100 via the second communication session, and also transmits data that is received from MFP 100 via the second communication session, to cloud server 400 via the first communication session.

It is here assumed that cloud server 400 has the same hardware configuration as that of management server 300 shown in FIG. 4. Therefore, the reference characters in the 300 series denoting respective hardware shown in FIG. 4 are hereinafter replaced with reference characters in the 400 series denoting the same.

Figure 13:
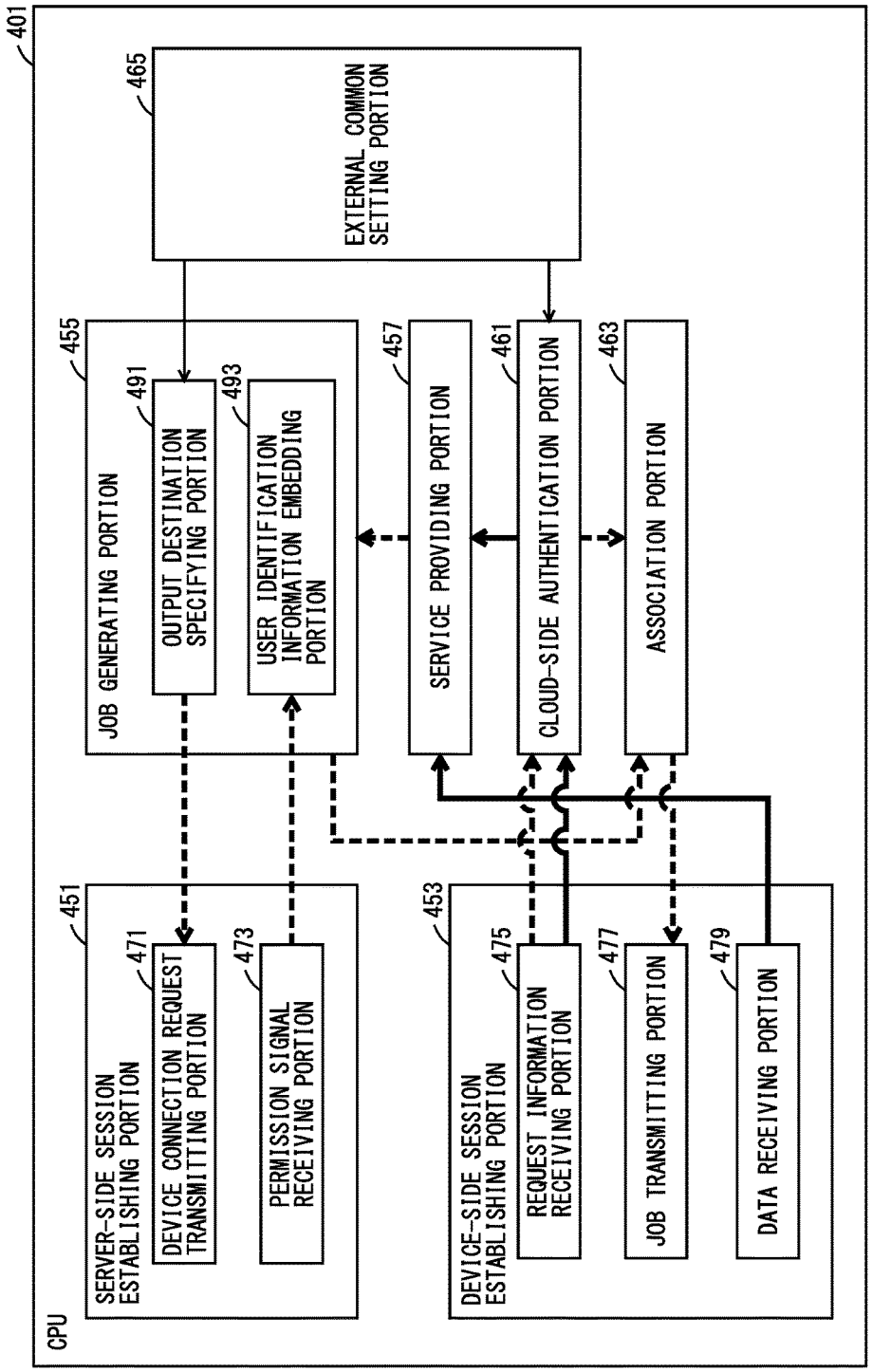
FIG. 13 is a block diagram showing, by way of example, the functions of a CPU included in the cloud server.

FIG. 13 is a block diagram showing, by way of example, the functions of a CPU included in the cloud server. The functions shown in FIG. 13 are formed in CPU 401 included in cloud server 400 as CPU 401 executes a service providing program stored in ROM 402, HDD 404, or CD-ROM 409A. Referring to FIG. 13, CPU 401 included in cloud server 400 includes a server-side session establishing portion 451, a device-side session establishing portion 453, a job generating portion 455, a service providing portion 457, a cloud-side authentication portion 461, an association portion 463, and an external common setting portion 465.

External common setting portion 465 registers for-borrowing association information. External common setting portion 465 stores in HDD 404 the for-borrowing association information associating the cloud identification information for identifying management server 300 with the address information of MFP 100. When an administrator of cloud server 400 inputs the for-borrowing association information to cloud server 400, external common setting portion 465 stores the for-borrowing association information in HDD 404. It is noted that, when management server 300 stores the for-loan association information, management server 300 may transmit to cloud server 400 a command of allowing part of the for-loan association information and the cloud identification information of management server 300 to be automatically registered.

<A Case of an Access from Cloud Server to MFP>

Service providing portion 457 authenticates a use who operates cloud server 400. Service providing portion 457 registers a user authorized as the user who operates cloud server 400, and permits a login only by the registered user to operate. Upon permission of the login by the user who operates cloud server 400, service providing portion 457 executes a prescribed process. It is here assumed, by way of example, that the prescribed process is a process of storing data. When data stored in HDD 404 is designated, service providing portion 457 reads out the data to output to job generating portion 455.

Job generating portion 455 includes an output destination specifying portion 491 and a user identification information embedding portion 493. Output destination specifying portion 491 refers to the for-borrowing association information stored by external common setting portion 465 so as to specify as an output destination a device which is selected by a user from a list of devices allowed for output. It is here assumed, by way of example, that MFP 100 is specified as the output destination. When MFP 100 is specified as the output destination, output destination specifying portion 491 refers to the for-borrowing association information, and specifies the address information of MFP 100 and the cloud identification information of management server 300. Output destination specifying portion 491 outputs to server-side session establishing portion 451 the address information of MFP 100 and the cloud identification information of management server 300.

Server-side session establishing portion 451, in response to input of the address information of MFP 100 and the cloud destination information of management server 300 from output destination specifying portion 491, controls communication portion 405 so as to establish a communication session with management server 300 disposed outside the firewall. The communication session established here is the global session. Server-side session establishing portion 451 controls communication portion 405, transmits a communication session establishment request to management server 300, and establishes the global session with management server 300.

Server-side session establishing portion 451 includes a device connection request transmitting portion 471 and a permission signal receiving portion 473. Device connection request transmitting portion 471 transmits a device connection request to management server 300. The device connection request includes the address information of MFP 100 and the waiting address information of cloud server 400. The waiting address information of cloud server 400 is a URL used by MFP 100 to access cloud server 400. The URL includes an address (domain name) of cloud server 400, a Web page identifier, an identifier (job ID) of the job executed by cloud server 400, and a listening port number.

Management server 300 receives the device connection request, and transmits a permission signal by return. Permission signal receiving portion 473 receives the permission signal which is transmitted by management server 300 via the global session. As mentioned above, the permission signal includes "Company B User ID" as the user identification information of a user who represents the members of Company B registered in MFP 100. Permission signal receiving portion 473 outputs "Company B User ID" as the user identification information to user identification information embedding portion 493.

Job generating portion 455, for data input from service providing portion 457, generates a job executed by MFP 100 as an output destination device specified by output destination specifying portion 491. Job generating portion 455 outputs to association portion 463 a pair of the generated job and a job ID for identifying the job.

User identification information embedding portion 493 embeds "Company B User ID" as the user identification information input from permission signal receiving portion 473, into a job, and thereby allows MFP 100 as the output destination device which receives the job to specify the user who has instructed an execution of the job. Here, since "Company B User ID" as the user identification information is input from permission signal receiving portion 473, MFP 100 executes the job in accordance with an instruction by the member of Company B.

When communication portion 405 receives a communication session establishment request from gateway device 200, device-side session establishing portion 453 establishes a communication session with gateway device 200. The communication session established here is the first communication session. Device-side session establishing portion 453 includes a request information receiving portion 475 and a job transmitting portion 477. When request information receiving portion 475 receives a connection request specification information from gateway device 200, request information receiving portion 475 outputs the connection request specification information and session identification information of the first communication session to cloud-side authentication portion 461. The connection request specification information includes the waiting address information of cloud server 400 and the address information of MFP 100.

Cloud-side authentication portion 461 specifies MFP 100 on the basis of the connection request specification information, and determines whether or not the specified MFP 100 is commonly set with cloud server 400. Specifically, cloud-side authentication portion 461 determines whether or not for-borrowing association information is stored in HDD 404 by external common setting portion 465, the for-borrowing association information including the device identification information of gateway device 200 included in the address information of MFP 100, and the device identification information of MFP 100. If such common setting information is stored in HDD 404, cloud-side authentication portion 461 determines that MFP 100 is commonly set with cloud server 400, and outputs to association portion 463 the waiting address information of cloud server 400 and the session identification information of the first communication session included in the connection request specification information.

Association portion 463 receives input of a job and a job ID from job generating portion 455, and receives from cloud-side authentication portion 461 the waiting address information of cloud server 400 and the session identification information of the first communication session. Association portion 463 associates the job with the first communication session. Specifically, association portion 463 associates the job with the first communication session specified by the session identification information coupled with the waiting address information including the job ID. Association portion 463 outputs to job transmitting 477 a pair of the job and the session identification information of the first communication session associated with the job.

Job transmitting portion 477 transmits the job input from association portion 463 via the first communication session specified by the session identification information input from association portion 463.

<A Case of an Access from MFP 100 to Cloud Server>

Device-side session establishing portion 453 includes a request information receiving portion 475 and a data receiving portion 479. When request information receiving portion 475 receives a cloud establishment request from gateway device 200, request information receiving portion 475 establishes a communication session with gateway device 200. The communication session established here is the first communication session. Request information receiving portion 475 outputs to cloud-side authentication portion 461 the device identification information of gateway device 200 having transmitted the cloud establishment request, the device identification information of MFP 100 included in the cloud establishment request, and the session identification information of the first communication session.

Cloud-side authentication portion 461 specifies MFP 100 on the basis of the device identification information of gateway device 200 and the device identification information of MFP 100, and determines whether or not the specified MFP 100 is commonly set with cloud server 400. Specifically, cloud-side authentication portion 461 determines whether or not for-borrowing association information is stored in HDD 404 by external common setting portion 465, the for-borrowing association information including the device identification information of gateway device 200 and the device identification information of MFP 100. If such common setting information is stored in HDD 404, cloud-side authentication portion 461 determines that MFP 100 is commonly set with cloud server 400, and outputs the session identification information of the first communication session to service providing portion 457.

Data receiving portion 479 receives data via the first communication session established by request information receiving portion 475, and outputs to service providing portion 457 a pair of the received data and the session identification information of the first communication session.

Service providing portion 457 executes a prescribed process for a piece of data, among pieces of data input from data receiving portion 479, coupled with the same session identification information as the session identification information input from cloud-side authentication portion 461. It is here assumed that the prescribed process is a process of storing the data in a prescribed area of HDD 404.

Figure 14:
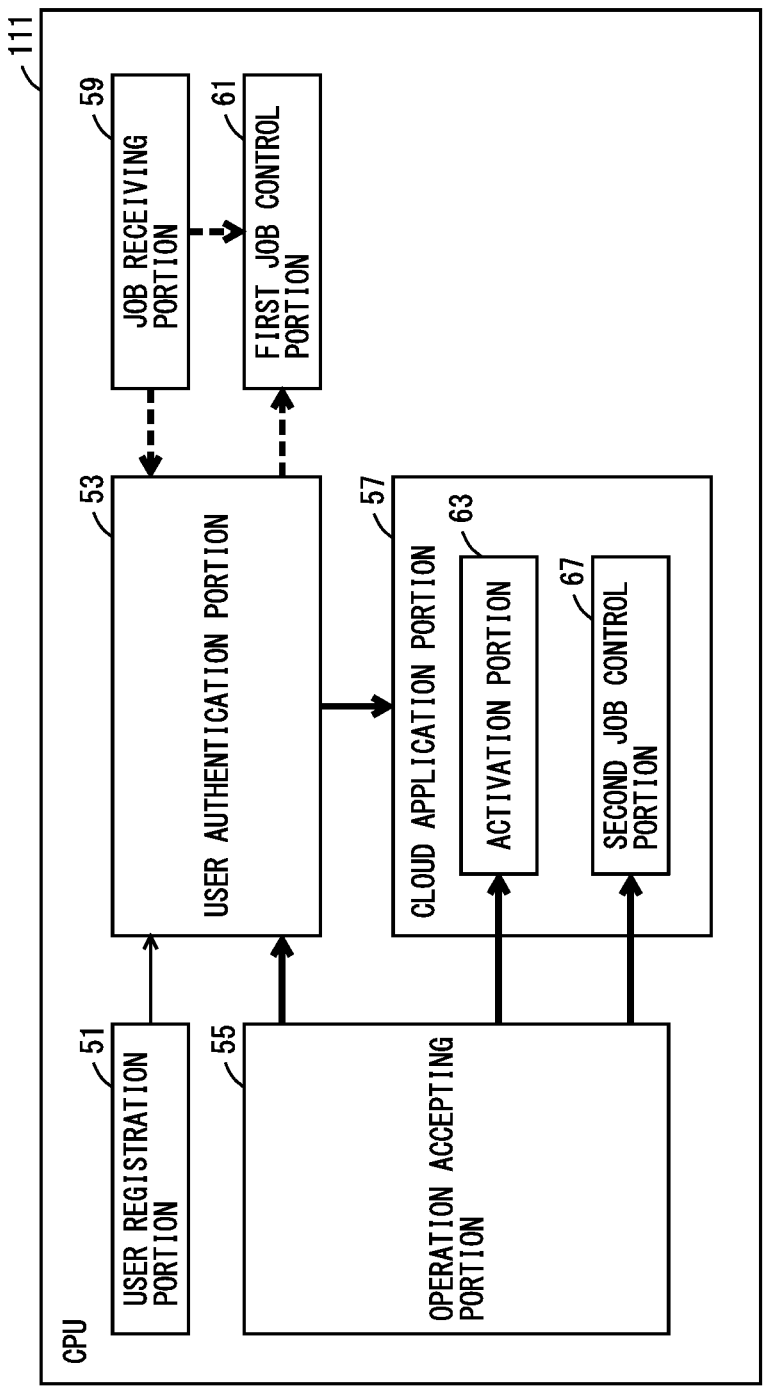
FIG. 14 is a block diagram showing, by way of example, the functions of a CPU included in the MFP.

FIG. 14 is a block diagram showing, by way of example, the functions of a CPU included in the MFP. The functions shown in FIG. 14 are formed in CPU 111 included in MFP 100 as CPU 111 executes a remote control program and a cloud application program stored in ROM 113, HDD 115, or CD-ROM 118. Referring to FIG. 14, CPU 111 includes a user registration portion 51, a user authentication portion 53, an operation accepting portion 55 which controls operation panel 160, a cloud application portion 57, a job receiving portion 59, and a first job control portion 61.

User registration portion 51 registers a user authorized to use MFP 100. User registration portion 51 accepts a pair of user identification information and a password which were input in operation panel 160 from an administrator of MFP 100 so as to add for storing to a user table stored in HDD 116. User registration portion 51 further stores In HDD 116 a group table associating a user and a group, in the case where the group having a plurality of users is permitted to log in. It is noted that the group table may include a group unable to be associated with a user. It is here assumed, by way of example, that "Company B User ID" as the user identification information of a representative user who represents the members of Company B is registered.

User authentication portion 53 authenticates a user who uses MFP 100. User authentication portion 53 accepts the user identification information or the group identification information input in operation panel 160 and a password, refers to the user table or the group table stored in HDD 116 so as to determine whether or not the user is authorized to use MFP 100. Further, user authentication portion 53 accepts the user identification information or the group identification information included in a job and a password, refers to the user table or the group table stored in HDD 116 so as to determine whether or not the user is authorized to use MFP 100.

<A Case of an Access from Cloud Serer to MFP>

Job receiving portion 59 controls communication I/F portion 112, externally receives a job, and outputs the received job to user authentication portion 53 and first job control portion 61, User authentication portion 53 performs authentication by using the user identification information or the group identification information included in the job. If the authentication is successful, user authentication portion 53 outputs an execution permission of the job to first job control portion 61.

First job control portion 61 executes the job on the condition that the execution permission is input from user authentication portion 53. First job control portion 61 executes the job under the instruction of a user authenticated by use authentication portion 53. For example, in the case where a process is designated as executable or unexecutable for each piece of the user identification information or the group identification information, if the process specified by the job is not designated as unexecutable or is designated as executable for the user identification information or group identification information, first job control portion 61 executes the job; if the process specified by the job is designated as unexecutable or is not designated as executable for the user identification information or the group identification information, first job control portion 61 does not execute the job. In the case where "Company B User ID" as the user identification information is set in the job, for example, if "Company B User ID" as the user identification information is not permitted to perform color printing, but only permitted to perform monochrome printing, and the job designates color printing, first job control portion 61 does not execute the job. It is here noted that if the job designates color printing, the job may be changed to designate monochrome printing to be executed.

<A Case of an Access from MFP to Cloud Serer>

When a user inputs authentication information to operation portion 163, operation accepting portion 55 accepts the authentication information and user authentication portion 53 authenticates the user. It is here assumed, by way of example, that the member of Company B inputs for login "Company B User ID" as the user identification information and a password which are assigned to Company B. In this case, user authentication portion 53 succeeds the authentication.

Cloud application portion 57 includes an activation portion 63 and a second job control portion 67. Activation portion 63, in response to an event that a user inputs an operation of access to cloud server in operation portion 163, controls communication I/F portion 112, establishes a second communication session with gateway device 200, and transmits a first activation request to gateway device 200 via the second communication session. The first activation request includes "Company B User ID" as the user identification information for identifying a user who operates MFP 100. This allows a tunnel connection between MFP 100 and cloud server 400 by gateway device 200 and management server 300.

Second job control portion 67 transmits resultant data acquired from execution of the job via the second communication session. For example, second job control portion 67 transmits data acquired from a document read by document reading portion 130 via the second communication session. This allows cloud server 400 to receive the data and execute a prescribed process for the data.

Figure 15:
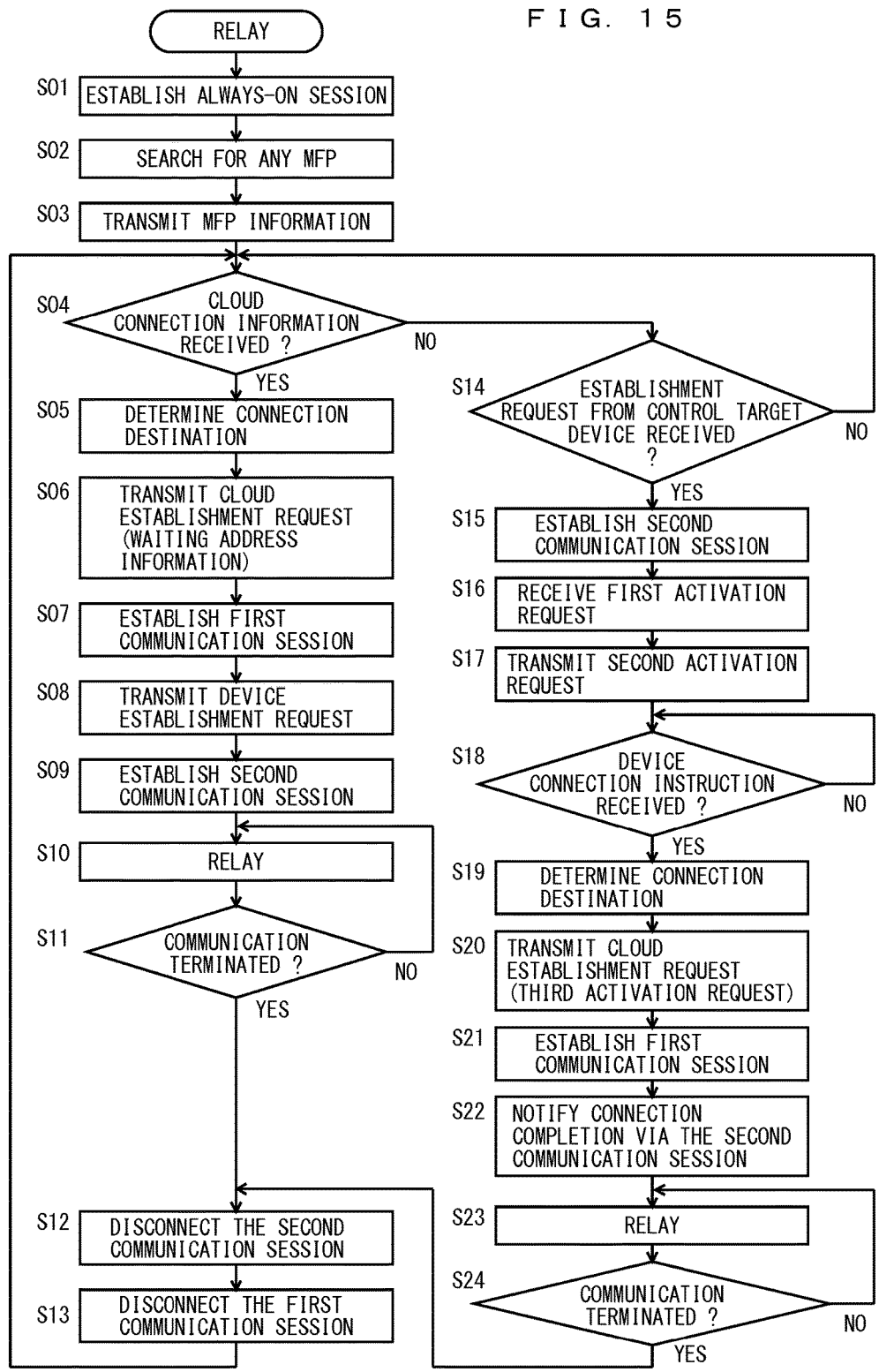
FIG. 15 is a flowchart illustrating an exemplary flow of a relay process.

FIG. 15 is a flowchart illustrating an exemplary flow of a relay process. The relay process is performed by CPU 201 included in gateway device 200 as CPU 201 executes a relay program stored in ROM 202, flash memory 204, or CD-ROM 209A. Referring to FIG. 15, CPU 201 included in gateway device 200 controls first communication portion 205 to establish an always-on session with management server 300 (step S01). Specifically, since cloud connection information shown in FIG. 5 is stored in flash memory 204, CPU 201 refers to the cloud connection information, and uses "Company A G/W ID" as the cloud identification information of management server 300 stored in flash memory 204 to transmit a communication session establishment request to management server 300, and performs prescribed negotiations with management server 300 to thereby establish the always-on session. The always-on session is not particularly limited, but it may be, for example, a message session based on XMPP.

In the following step S02, CPU 201 searches for any device connected to LAN 3 located inside the firewall. Specifically, CPU 201 broadcasts an inquiry over LAN 3, and acquires device identification information returned from each of MFPs 100, 100A, 100B, and thereby finds MFPs 100, 100A, and 100B. The device identification information may be, but not limited to, a local IP address assigned to each of MFPs 100, 100A, and 100B in LAN 3.

In the following step S03, CPU 201 transmits to management server 300 via the always-on session established in step S01 the device identification information of each of MFPs 100, 100A and 100B detected in step S02. This allows management server 300 to recognize MFPs 100, 100A and 100B connected to gateway device 200. Alternatively, CPU 201 may acquire device information of each of MFPs 100, 100A and 100B so as to transmit the device information in addition to the device identification information. The device information is information indicating the status of each of MFPs 100, 100A and 100B, and it includes: information about a job being executed, its operation status, its error occurrence status, configuration of optional equipment, version information of a firmware program, version information of an application program, free space remaining in HDD 116, a counter value of printed copies, the number of queued jobs, and setting values.

In the following step S04, CPU 201 determines whether or not a cloud connection instruction has been received. If CPU 201 has received the cloud connection instruction from management server 300 via the always-on session, the process then proceeds to step S05; otherwise, the process proceeds to step S14. The cloud connection instruction includes the device identification information and the waiting address information of a control target device. The control target device is any one of MFPs 100, 100A and 100B. The waiting address information includes the cloud identification information for identifying a cloud, and the cloud is either one of management server 300 and cloud server 400. It is here assumed, by way of example, that the cloud connection information includes the device identification information of MFP 100 and the waiting address information issued by cloud server 400. The waiting address information issued by cloud server 400 includes the cloud identification information of cloud server 400.

In step S05, CPU 201 determines a connection destination. CPU 201, on the basis of the cloud identification information included in the waiting address information included in the cloud connection instruction received in step S04, determines cloud server 400 as a first connection destination, and on the basis of the device identification information of a control target device included in the cloud connection instruction, CPU 201 determines MFP 100 as a second connection destination.

In step S06, CPU 201 controls first communication portion 205 so as to transmit a cloud establishment request to cloud server 400 determined as the first connection destination. The cloud establishment request is a signal for requesting an establishment of a communication session, and includes the waiting address information included in the cloud connection instruction received in step S04. In the following step S07, CPU 201 establishes a first communication session. CPU 201 performs a prescribed negotiations with cloud server 400 which has transmitted the cloud establishment request to thereby establish the first communication session with cloud server 400.

In step S08, CPU 201 controls second communication portion 206 so as to transmit a device establishment request to MFP 100 determined as the second connection destination. The device establishment request is a signal for requesting an establishment of a communication session. Then CPU 201 establishes a second communication session (step S09). CPU 201 performs a prescribed negotiations with MFP 100 which has transmitted the device establishment request to thereby establishes the second communication session with MFP 100.

In the following step S10, CPU 201 uses the first and second communication sessions to relay a communication between cloud server 400 and MFP 100. For example, CPU 201 transmits to MFP 100 via the second communication session on behalf of cloud server 400 the data received from cloud server 400 via the first communication session, and transmits to cloud server 400 via the first communication session on behalf of MFP 100 the data received from MFP 100 via the second communication session.

In the following step S11, CPU 201 determines whether the communication has been terminated. For example, in the case where a communication end notification is received from cloud server 400 via the first communication session, CPU 201 determines that the communication has been terminated. If CPU 201 determines that the communication is terminated (YES in step S11), the process proceeds to step S12; otherwise, i.e. CPU 201 determines that the communication is not terminated (NO in step S11), the process returns to S10. In step S12, CPU 201 disconnects the second communication session established in step S09, and the process proceeds to step S13. In step S13, CPU 201 disconnects the first communication session established in step S07, and the process returns to step S04.

In step S14, CPU 201 determines whether or not second communication portion 206 has received an establishment request of communication session from the control target device. If CPU 201 determines that second communication portion 206 has received the establishment request, the process proceeds to step S15; otherwise, the process returns to S04. It is here assumed, by way of example, that the establishment request is received from MFP 100. In step S15, CPU 201 establishes a second communication session with MFP 100 which has transmitted the establishment request, and the process proceeds to Step S16.

In step S16. CPU 201 receives a first activation request via the second communication session. The first activation request includes the user identification information of a user who has logged in MPF 100. It is here assumed, by way of example, that the member of Company B has logged in MFP 100, using "Company B User ID" as the user identification information. In this case the first activation request includes "Company B User ID" as the user identification information.

In step S17, CPU 201 transmits a second activation request to management server 300. The second activation request includes "MFP-1" as the device identification information of MFP 100 which has transmitted the first activation request, and "Company B User ID" as the user identification information included in the first activation request. CPU 201 transmits the second activation request to management server 300 via the always-on session established with management server 300 in step S01.

In step S18, CPU 201 determines whether or not a device connection instruction has been received. CPU 201 is in a standby mode until the device connection instruction is received from management server 300 via the always-on session, and once the device connection information is received, the process proceeds to step S19. The device connection instruction includes device identification information of a control target device, and cloud identification information. The device identification information of a control target device is "MFP-1" as the device identification information of MFP 100 which has transmitted the first activation request. The cloud identification information is determined by management server 300. It is here assumed, by way of example, that the cloud identification information includes "Company B Cloud ID" as the cloud identification information of cloud server 400.

In step S19, CPU 201 determines a connection destination. CPU 201, on the basis of the cloud identification information included in the device connection instruction received in step S18, determines cloud server 400 as a first connection destination, and on the basis of the device identification information of a control target device included in the device connection instruction, CPU 201 determines MFP 100 as a second connection destination.

In step S20, CPU 201 controls first communication portion 205 so as to transmit a cloud establishment request to cloud server 400 determined as the first connection destination. The cloud establishment request is a signal for requesting an establishment of a communication session, and includes a third activation request. The third activation request includes "MFP-1" as the device identification information of a control target device included in the device connection instruction. In the following step S21, CPU 201 establishes a first communication session. CPU 201 performs a prescribed negotiations with cloud server 400 which has transmitted the cloud establishment request to thereby establish the first communication session with cloud server 400.

In step S22, CPU 201 transmits a connection completion notification to MFP 100 determined as the second connection destination in step S19. Since the second communication session with MFP 100 is established in step S15, CPU 201 transmits the connection completion notification to MFP 100 via the second communication session.

In the following step S23, CPU 201 uses the first and second communication sessions so as to relay a communication between cloud server 400 and MFP 100. In step S24, CPU determines whether or not the communication has been terminated. If CPU 201 determines that the communication is terminated (YES in step S24), the process proceeds to step S12; otherwise, i.e. CPU 201 determines that the communication is not terminated (NO in step S24), the process returns to step S23.

Figure 16:
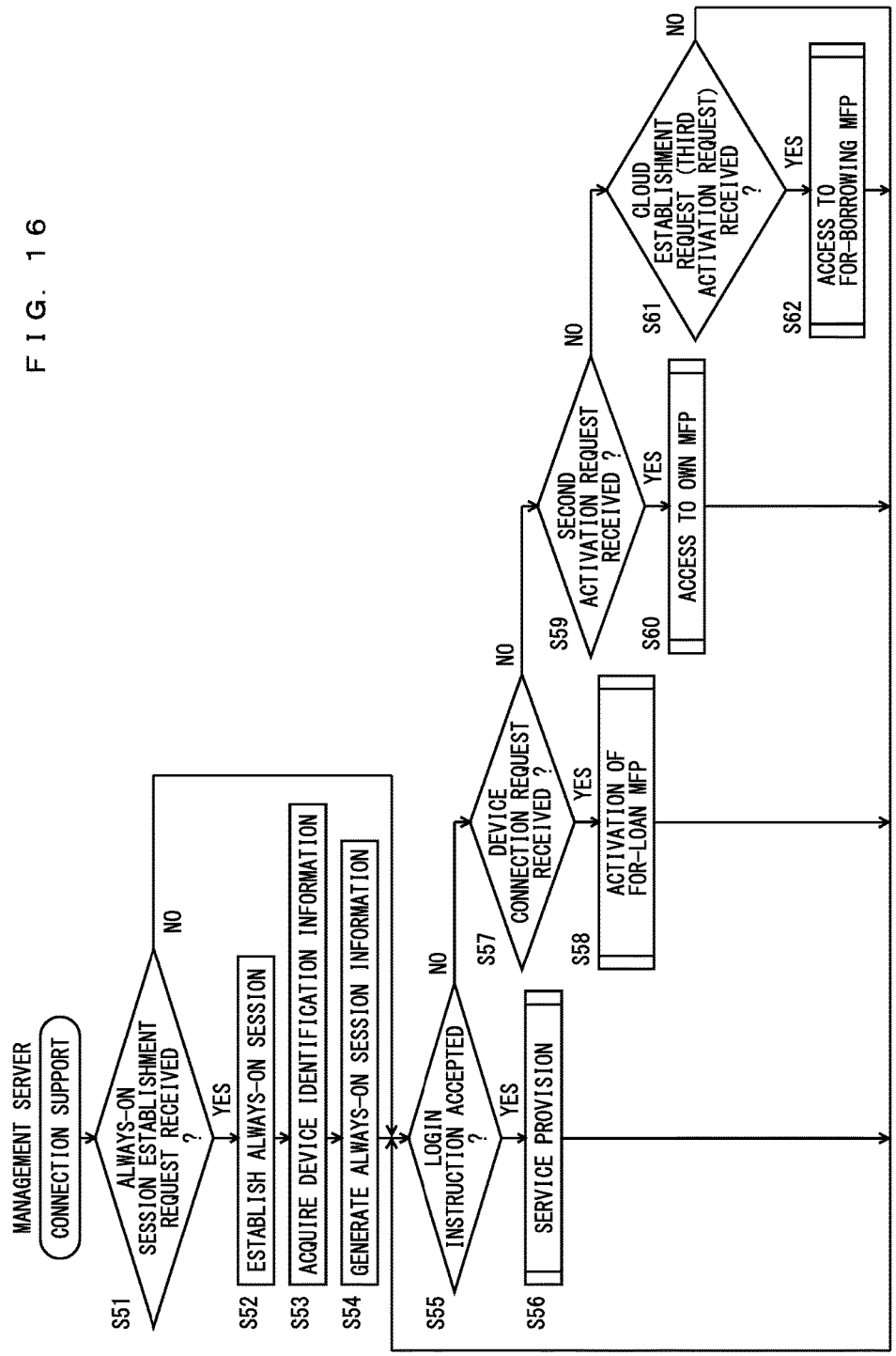
FIG. 16 is a flowchart illustrating an exemplary flow of a connection support process.

FIG. 16 is a flowchart illustrating an exemplary flow of a connection support process. The connection support process is carried out by CPU 301 included in management server 300 as CPU 301 executes a program stored in ROM 302, HDD 304, or CD-ROM 309A. Further, the connection support process is carried out by CPU 401 included in cloud server 400 in the same manner as management server 300. Here, the process carried out by management server 300 will be described.

Referring to FIG. 16, CPU 301 determines whether an always-on session establishment request has been received (step S51). Specifically, CPU 301 determines whether communication portion 305 has received, from gateway device 200, a request (always-on session establishment request) for establishment of a communication session for constant connection. If CPU 301 determines that the always-on session establishment request has been received, the process proceeds to step S52; otherwise, the process proceeds to step S55.

In step S52, CPU 301 establishes the always-on session with gateway device 200, and the process proceeds to step S53. In step S53, CPU 301 acquires device identification information of any of control target devices from gateway device 200 via the always-on session. Here, it is assumed that the device identification information of each of MFPs 100, 100A, and 100B is acquired. In step S54, CPU 301 generates always-on session information, here, the always-on session information shown in FIG. 6. The always-on session information associates gateway device 200 with each of MFP 100, 100A and 100 B connected thereto.

In step S55, CPU 301 determines whether or not a login instruction is accepted. In the case where a user who operates an external PC inputs a login instruction in management server 300 via the PC, CPU 301 accepts the login instruction. Once CPU 301 accepts the login instruction, the process proceeds to step S56; otherwise, the process proceeds to step S57. In step S56, CPU 301 executes a service providing process, and the process returns to step S55. The service providing process will be described in detail later.

In step S57, CPU 301 determines whether or not a device connection request is received. If communication portion 305 receives the device connection request from cloud server 400 disposed outside the firewall, the process proceeds to step S58; otherwise, the process proceeds to step S59. In step S58, CPU 301 executes a loaned MFP activation process, and the process returns to step S55. The loaned MFP activation process will be described in detail later.

In step S59, CPU 301 determines whether or not a second activation request is received. If communication portion 305 receives the second activation request from gateway device 200, the process proceeds to step S60; otherwise, the process proceeds to step S61. In step S60, CPU 301 executes an own MFP access process, and the process returns to step S55. The own MFP access process will be described in detail later.

In step S61, CPU 301 determines whether or not a cloud establishment request including a third activation request is received. If communication portion 305 receives the cloud establishment request including the third activation request from another cloud, for example, cloud server 400, the process proceeds to step S62; otherwise, the process returns to step S55. In step S62, CPU 301 executes a borrowed MFP access process, and the process returns to step S55. The borrowed MFP access process will be described in detail later.

Figure 17:
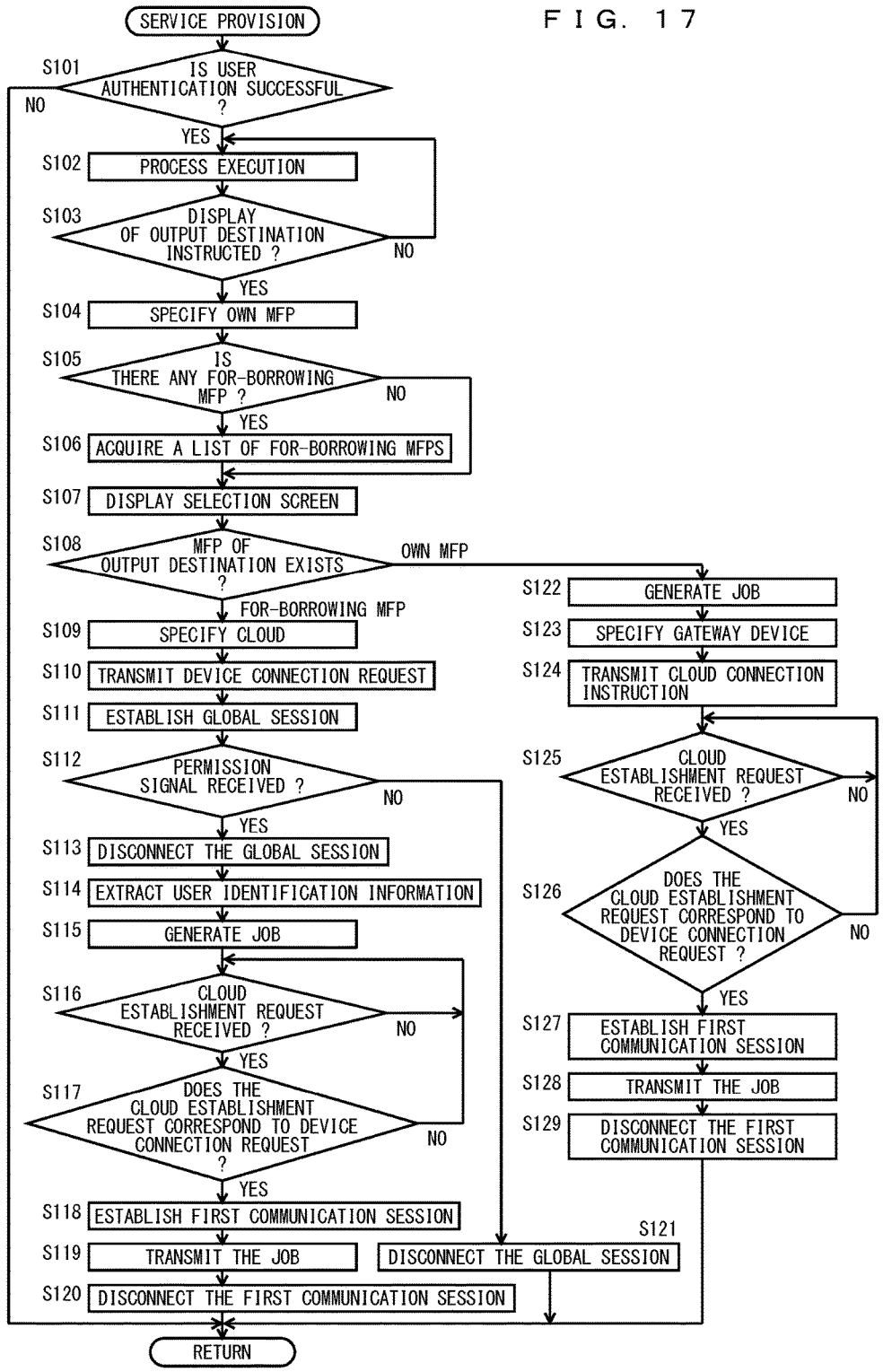
FIG. 17 is a flowchart illustrating an exemplary flow of a service providing process.

FIG. 17 is a flowchart illustrating an exemplary flow of a service providing process. The service providing process is carried out in step S56 of the connection support process shown in FIG. 16. It is here assumed, by way of example, that cloud server 400 executes the service providing process. A login instruction is accepted at a stage before execution of the service providing process. The login instruction includes user identification information and a password and the like. In step S101, CPU 301 determines whether or not user authentication is successful. If the user authentication is successful, the process proceeds to step S102; otherwise, the process returns to the connection support process. Here, a user authorized to use cloud server 400 is the member of Company B. Therefore, the user authentication is successful in the case where the member of Company B can log in as the user.

In step S102, CPU 301 executes a process in accordance with an instruction by the user who logged in. The process to be executed here is a process for providing a prescribed service for cloud server 400. In step S103, CPU 301 determines whether or not an instruction to display an output destination is accepted. If the instruction to display is accepted, the process proceeds to step S104; otherwise, the process returns to step S102. In step S104, an own MFP is specified. If always-on session information is stored in HDD 404, the own MFP is specified by referring to the always-on session information. For example, in the case where management server 300 executes the service providing process, since the always-on session information shown in FIG. 6 is stored, management server 300 specifies as the own MFP each of MFPs 100, 100A and 100B connected to gateway device 200.

In the following step S105, CPU 301 determines whether or not a borrowed MFP exists. If the borrowed MFP exists, CPU 301 specifies the borrowed MFP, and the process proceeds to step S107. CPU 301 determines that the borrowed MFP exists in the case where for-borrowing association information is stored in HDD 404. Since the for-borrowing association information shown in FIG. 8 is stored in cloud server 400, CPU 301 specifies, as the borrowed MFP, MFP 100 specified by "MFP-1" as the device identification information.

In step S107, CPU 301 displays a device selection screen. Specifically, CPU 301 transmits the device selection screen to a PC operated by a user who remotely operates cloud server 400. The device selection screen is a screen which displays output destinations in a selectable manner, and in the case where step S106 is executed, the device selection screen displays the own MFP specified in step S104 and the borrowed MFP specified in a selectable manner. Since the always-on session information is not stored in HDD 400, and the for-borrowing association information shown in FIG. 8 is stored in cloud server 400, CPU 301 displays the device selection screen in which MFP 100 specified in step S105 may be selectable.

In the following step S108, CPU 301 branches a process depending on whether the output destination selected in the device selection screen by the user is an own MFP or a borrowed MFP. If the borrowed MFP is selected, the process proceeds to step S109; if the own MFP is selected, the process proceeds to step S122. Hereinafter, it is assumed, by way of example, that MFP 100 is selected as the output destination.

In step S109, CPU 301 specifies a cloud, which manages MFP 100 selected as the output destination. Referring to the for-borrowing association information shown in FIG. 8, CPU 301 specifies management server 300 associated with MFP 100.

In the following step S110, CPU 301 transmits a device connection request to management server 300 as a cloud specified in step S109. The device connection request includes the address information of MFP 100 selected as the output destination, and the waiting address information of cloud server 400. The waiting address information of cloud server 400 is a URL for an access to cloud server 400, and includes cloud identification information of cloud server 400 and an identifier (job ID) of the job executed by cloud server 400.

In the following step S111, CPU 301 establishes a global session with the management server 300 specified in step S109, and the process proceeds to step S112. In step S112, if CPU 301 receives a permission signal from management server 300, the process proceeds to step S113; otherwise, the process proceeds to step S121. In step S121, CPU 301 disconnects the global session, and the process returns to the relay process.

In step S113, CPU 301 disconnects the global session, and the process proceeds to step S114. In step S114, CPU 301 extracts the user identification information from the permission signal received in step S112. In the following step S115, CPU 301 generates a job for causing MFP 100 selected as the output destination to output resultant data acquired from execution of a process in step S102, and the process proceeds to step S116. Upon generation of a job in step S115, CPU 301 embeds into the job the user identification information extracted in step S114.

In Step S116, CPU 301 determines whether a cloud establishment request has been received. The cloud establishment request, in response to an event that a device connection request is transmitted in step S110, is transmitted from gateway device 200, and the cloud establishment request includes the waiting address information included in the device connection request. CPU 301 is in a standby mode until the cloud establishment request is received, and once the cloud establishment request is received, the process proceeds to step S117. In step S117, CPU 301 determines whether or not the cloud establishment request corresponds to the device connection request transmitted in step S110. If the waiting address information included in the cloud establishment request is matched to the waiting address information included in the device connection request, CPU 301 determines that the cloud establishment request corresponds to the device connection request. If the cloud establishment request corresponds to the device connection request, the process proceeds to step S118; otherwise, the process returns to step S116.

In step 118, CPU 301 establishes a first communication session with gateway device 200 which has transmitted the cloud establishment request, and the process proceeds to step S119. In step S119, CPU 301 transmits a job generated in step S115 via the first communication session, and the process proceeds to step S120. In step S120, CPU 301 disconnects the first communication session, and the process returns to the connection support process.

As to the processes in step S122 to step S129, it is assumed, by way of example, that management server 300 executes the processes. In this case, a user authenticated in step S101 is the member of Company A which manages management server 300. Further, a device selection screen displayed in step S107 is a screen in which each of MFPs 100, 100A and 100B is selectable. It is here assumed, by way of example, that MFP 100 is selected as an output destination.

In step S122, CPU 301 generates a job for causing MFP 100 selected as the output destination resultant data acquired from execution of a process in step S102, and the process proceeds to step S123. Upon generation of the job, CPU 301 embeds into the job the user identification information of a user authenticated in step S101.

In the following step S123, CPU 301 refers to the always-on session information shown in FIG. 6 so as to specify gateway device 200 to which MFP is connected. Then CPU 301 transmits a cloud connection instruction to the specified gateway device 200. In this case, since the always-on session is established between management server 300 and gateway device 200, CPU 301 transmits the cloud connection instruction via the always-on session. The cloud connection instruction includes the device identification information of MFP 100 selected as the output destination, and the waiting address information of management server 300. The waiting address information of management server 300 is a URL for an access to management server 300, and includes the cloud identification information of management server 300 and an identifier (job ID) of the job executed by management server 300.

In the following step S125, CPU 301 is in a standby mode until a cloud establishment request is received from gateway device 200, and once the cloud establishment request is received, the process proceeds to step S126. The cloud establishment request, in response to an event that the cloud connection instruction is transmitted in step S124, is transmitted from gateway device 200, and includes the waiting address information of management server 300 included in the cloud connection instruction. In step S126, CPU 301 determines whether or not the cloud establishment request corresponds to the cloud connection instruction transmitted in step S124. If the waiting address information included in the cloud establishment request is matched to the waiting address information included in the cloud connection instruction, CPU 301 determines that the cloud establishment request corresponds to the cloud connection instruction. If the cloud establishment request corresponds to the cloud connection instruction, the process proceeds to step S127; otherwise, the process returns to step S125.

In step 127, CPU 301 establishes a first communication session with gateway device 200 which has transmitted the cloud establishment request, and the process proceeds to step S128. In step S128, CPU 301 transmits a job generated in step S122 via the first communication session, and the process proceeds to step S129. In step S129, CPU 301 disconnects the first communication session, and the process returns to the connection support process.

FIG. 18 is a flowchart illustrating an exemplary flow of a loaned MFP activation process. The loaned MFP activation process is a process executed in step S58 of the connection support process shown in FIG. 16. A device connection request is received from cloud server 400 at a stage before the loaned MFP activation process is executed. The device connection request includes the address information of a control target device and the waiting address information of a cloud. It is here assumed that the device connection request is a device connection request to be transmitted to management server 300 in step S110 explained in the service providing process executed by cloud server 400. In this case, the device connection request includes the address information of MFP 100 and the waiting address information of cloud server 400.

Referring to FIG. 18, CPU 301 establishes a global session with cloud server 400 which has transmitted the device connection request (step S71). In the following step S72, CPU 301 determines whether or not a control target device is a loaned MFP depending on whether the address information of the control target device included in the device connection request is included in the always-on session information. Specifically, CPU 301 determines whether or not the address information of MFP 100 included in the device connection request is included in the always-on session information shown in FIG. 6. The address information of MFP 100 includes "Company A G/W ID" as the device identification information of gateway device 200 and "MFP-1" as the device identification information of MFP 100, which are included in the always-on session information, and thereby the control target device is determined as the loaned MFP. If the control target device is the loaned MFP, the process proceeds to step S73; otherwise, the process proceeds to step S77.

In step S73, CPU 301 determines a user. Referring to the for-loan association information shown in FIG. 7, CPU 301 specifies a user who is associated with the address information of MFP 100 as the control target device. Here, the user having "Company B User ID" as the user identification information is specified.

In the following step S74, CPU 301 transmits a permission signal via the global session to cloud server which has transmitted a device connection request, and the process proceeds to step S75.

In the following step S75, CPU 301 disconnects the global session established in step S71, and the process proceeds to step S76. In step S76, CPU 301 specifies a gateway device to which a control target device is connected. Specifically, CPU 301 refers to the device information of gateway device 200 included in the address information of MFP 100 included in the device connection request so as to specify gateway device 200. In the following step S77, CPU 301 transmits a cloud connection instruction to the specified gateway device 200 via the always-on session. The cloud connection instruction includes the device identification information of MFP 100 as the control target device and the waiting address information of cloud server 400 included in the device connection request.

In step S78, CPU 301 transmits an error signal via the global session to cloud server 400 which has transmitted the device connection request, and the process proceeds to step S79. In step S79, CPU 301 disconnects the global session established in step S71, and the process returns to the connection support process.

Figure 19:
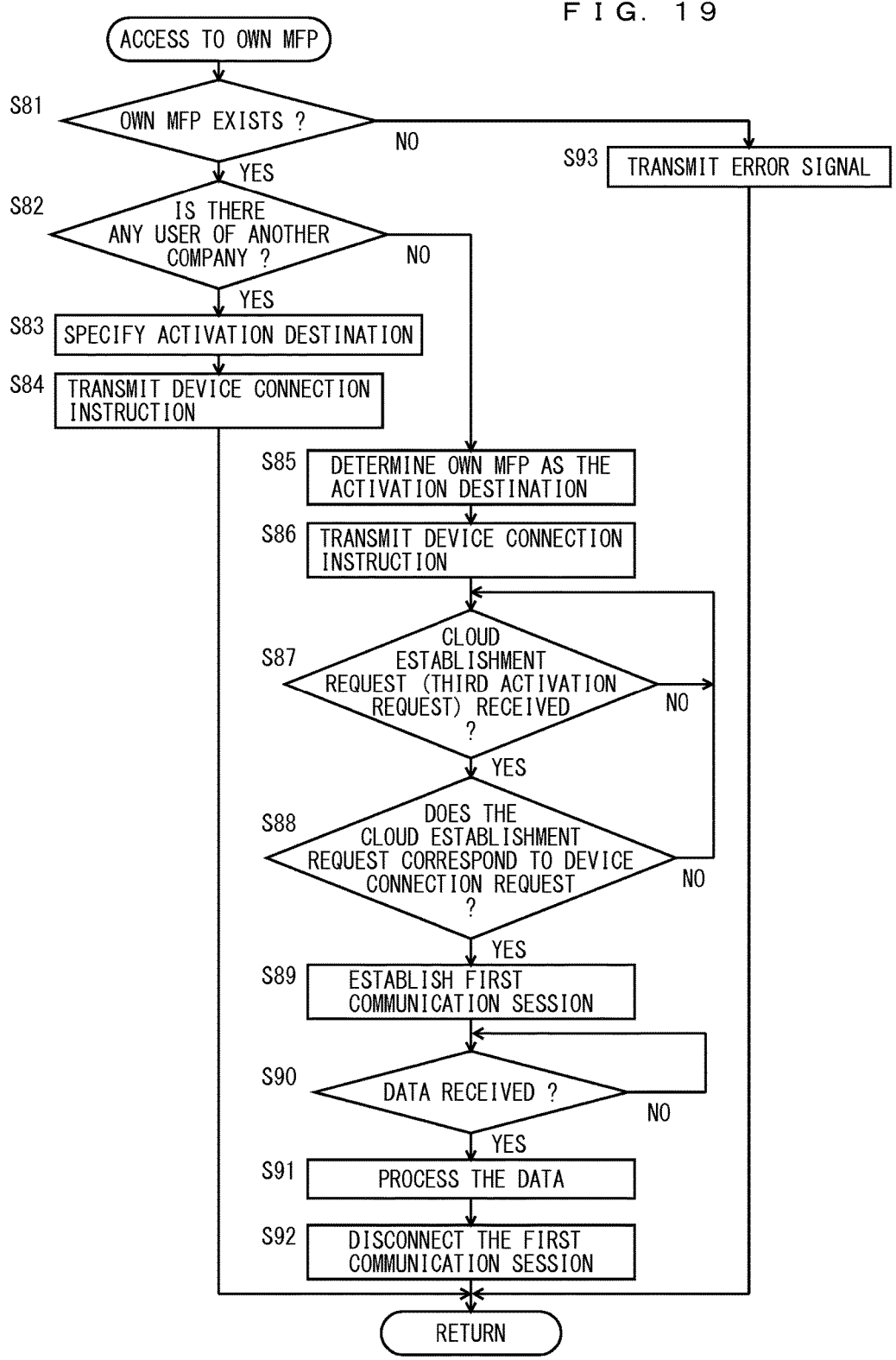
FIG. 19 is a flowchart illustrating an exemplary flow of an own MFP access process.

FIG. 19 is a flowchart illustrating an exemplary flow of an own MFP access process. The own MFP access process is a process executed in step S60 of the connection support process shown in FIG. 16. A second activation request is received from gateway device 200 at a stage before the own MFP access process is executed. The second activation request includes the device identification information of a control target device and the user identification information of a user who has logged in the control target device.

Referring to FIG. 19, CPU 301 determines whether or not a control target device is an own MFP (step S81). CPU 301 refers to the always-on session information shown in FIG. 6, and if the device identification information of the control target device included in the second activation request is registered in the always-on session information, CPU 301 determines that the control target device is the own MFP. If the control target device is the own MFP, the process proceeds to step S82; otherwise, the process proceeds to step S93. In step S93, CPU transmits an error signal to gateway device 200 which has transmitted the second activation request, and the process returns to the connection support process.

In step S82, CPU 301 determines whether or not the user who has logged in the control target device is a user of another company. CPU 301 refers to the for-loan association information shown in FIG. 7, and determines whether or not the user who has logged in the control target device is a user of another company from the device identification information of a control target device and the user identification information which are included in the second activation request. For example, in the case where the second activation request includes "MFP-1" as the device identification information of MFP 100 and "Company B User ID" as the user identification information of a user who represents the members of Company B, CPU 301 determines that the user who has logged in MFP 100 as the control target device is a member of another company. If the user who has logged in MFP 100 as the control target device is the member of another company, the process proceeds to step S83; otherwise, the process proceeds to step S85.

In step S83, CPU 301 specifies an activation destination. CPU 301 specifies the for-loan association information including "MFP-1" as the device identification information of MFP 100 and "Company B User ID" as the user identification information of the member of Company B included in the second activation request, and specifies a shared destination cloud ID included in the for-loan association information. Referring to the for-loan association information shown in FIG. 7, CPU 301 specifies as the activation destination cloud server 400 specified by "Company B Cloud ID" as the cloud identification information.

In the following step S84, CPU 301 transmits a device connection instruction to gateway device 200 via the always-on session, and the process returns to the connection support process. The device connection instruction includes "MFP-1" as device identification information of MFP 100 included in the second activation request, and "Company B Cloud ID" as the cloud identification information of cloud server 400 specified as the activation destination in step S83.

In step S85, CPU 301 specifies the own device as the activation destination, and the process proceeds to step S86. In step S86, CPU 301 transmits a device connection instruction to gateway device 200 via the always-on session, and the process returns to the connection support process. The device connection instruction includes "MFP-1" as the device identification information of MFP 100 included in the second activation request, and "Company A Cloud ID" as the cloud identification information of management server 300 as the own device specified as the activation destination in step S85.

In step S87, CPU 301 is in a standby mode until the cloud establishment request is received from gateway device 200, and once the cloud establishment request is received, the process proceeds to step S126. The cloud establishment request, in response to an event that the device connection instruction is transmitted in step S86, is transmitted from gateway device 200, and includes "MFP-1" as the device identification information of MFP 100 included in the device connection instruction. In step S88, CPU 301 determines whether or not the cloud establishment request corresponds to the device connection instruction transmitted in step S86. If the device identification information of a control target device included in the cloud establishment request is matched to the device identification information of MFP 100 included in the device connection instruction, CPU 301 determines that the cloud establishment request corresponds to the device connection instruction. If the cloud establishment request corresponds to the device connection instruction, the process proceeds to step S89; otherwise, the process returns to the connection support process.

In step S89, CPU 301 establishes a first communication session with gateway device 200 which has transmitted the cloud establishment request, and the process proceeds to step S90. In step S90, CPU 301 is in a standby mode until data is received from MFP 100 as the control target device via the first communication session, and once the data is received, the process proceeds to step S91. In step S91, CPU 301 executes a prescribed data process for the received data, and the process proceeds to step S92. The prescribed data process is a process previously determined for Company A in management server 300. In step S92, CPU 301 disconnects the first communication session and the process returns to the connection support process.

Figure 20:
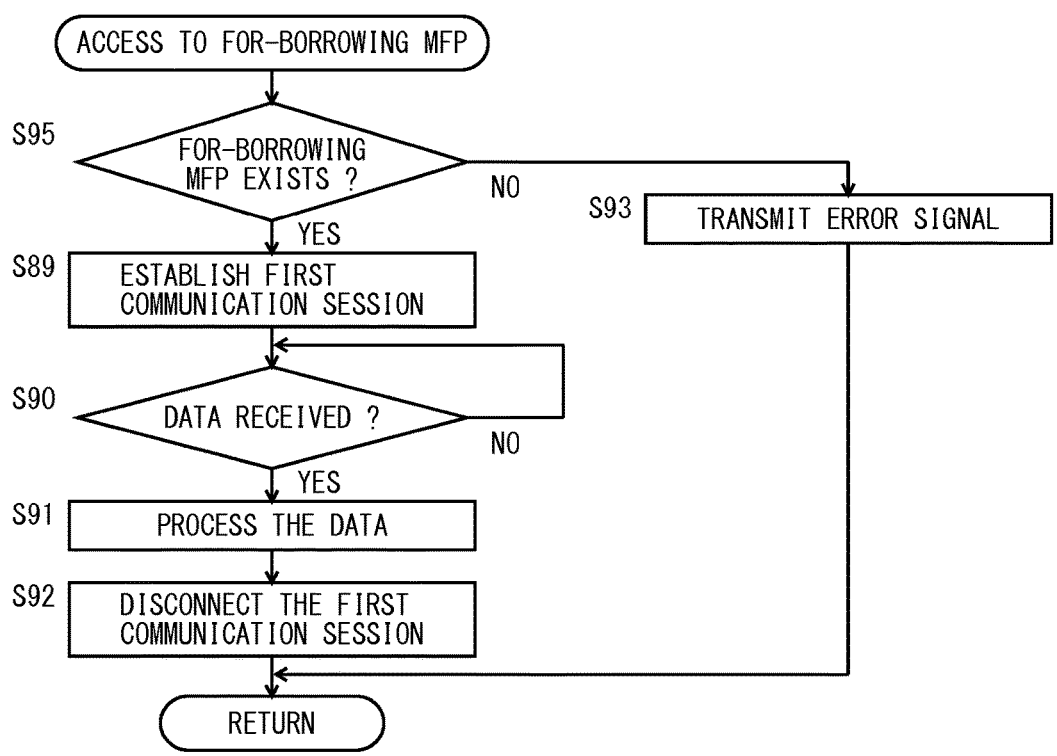
FIG. 20 is a flowchart illustrating an exemplary flow of a borrowed MFP access process.

FIG. 20 is a flowchart illustrating an exemplary flow of a borrowed MFP access process. The borrowed MFP access process is a process executed in step S62 of the connection support process shown in FIG. 16. A third activation request is received from gateway device 200 at a stage before the borrowed MFP access process is executed. The third activation request includes the address information of a control target device. It is here assumed, by way of example, that cloud server 400 executes the borrowed MFP access process. When CPU 401 included in cloud server 400 receives the third activation request from gateway device 200, CPU 401 determines whether or not the control target device is a borrowed MFP (step S95). Specifically, CPU 401 refers to the for-borrowing association information shown in FIG. 8, and if a pair of "MFP-1" as the device identification information included in the third activation request and "Company A G/W ID" as the gateway identification information of gateway device 200 which has transmitted the third activation request is registered, CPU 401 determines that MFP 100 as the control target devices is the borrowed MFP. If the control target device is the borrowed MFP, the process proceeds to step S89; otherwise, the process proceeds to step S93. In step S93, CPU 401 transmits an error signal by return, and the process returns to the connection support process.

In step S89, CPU 401 establishes a first communication session with gateway device 200 which has transmitted the third activation request, and the process proceeds to step S90. In step S90, CPU 401 is in a standby mode until data is received from MFP 100 as the control target device via the first communication session, and once the data is received, the process proceeds to step S91. In step S91, CPU 401 executes a prescribed data process for the received data, and the process proceeds to step S92. The prescribed data process is a process previously determined for Company B in cloud server 400. In step S92, CPU 401 disconnects the first communication session, and the process returns to the connection support process.

As described above, connection control system 1 according to the present embodiment includes; management server 300 disposed outside a firewall and capable of supporting connection of communications between any of MFPs 100, 100A and 100B disposed inside the firewall and cloud server 400 disposed outside the firewall; and gateway device 200 capable of communicating with a control target device disposed inside the firewall. Management server 300 stores the for-loan association information which associates cloud server 400 and gateway way device 200 with MFP 100 from among MFPs 100, 100A and 100B, and management server 300 establishes the always-on session in order to communicate with gateway device 200. Therefore, it is possible to access gateway device 200 from management server 300 via the always-on session. Further, management server 300, in response to an event that a connection request is externally received, transmits to gateway device 200 via the always-on session a connection instruction to relay communications between MFP 100 and cloud server 400 associated with MFP 100 by the for-loan association information. When gateway device 200 receives the connection instruction, gateway device establishes a first communication session with cloud server 400, and a second communication session with MFP 100 so as to relay communications between cloud server 400 and MFP 100. Thus, it is possible to establish a communication path between MFP 100 and cloud server 400 which are associated with each other by the for-loan association information registered in management server 300.

Further, management server 300 receives from cloud server 400 a device connection request which requests a connection with MFP 100, transmits a connection instruction to gateway device 200 on the condition that MFP 100 specified by the connection request and cloud server 400 are associated by the for-loan association information. Gateway device 200, in response to reception of the connection instruction, establishes a second communication session with MFP 100. Thus, it is possible, upon receipt of a request from cloud server 400 outside the firewall, to establish a communication path between cloud server 400 and MFP 100.

Further, cloud server 400 stores the for-borrowing association information which associates gateway device 200 and management server 300 with MFP 100, and in response to an event that a user instructs connections with MFP 100, cloud server 400 transmits a device connection request to management server 300 associated with MFP 100 by the for-borrowing association information. Thus, it is possible for the user who operates cloud server 400 to establish a communication path between cloud server 400 and MFP 100 registered in the cloud server.

Further, in response to an event that management server 300 receives the device connection request from cloud server 400, the cloud connection instruction to be transmitted to gateway device 200 includes connection request specification information which specifies a connection request received from cloud server 400, the connection request specification information is transmitted to cloud server 400 upon establishment of the first communication session, and cloud server 400 associates the connection request with the first communication session on the basis of the connection request specification information. Thus, it is possible for cloud server 400 to establish a communication path with MFP 100 which has instructed the connection.

Further, MFP 100 registers a representative user who represents the members of Company B permitted to use cloud server 400, and the for-loan association information registered in management server 300 associates MFP 100 with the representative user registered in the MFP 100. In the case where the device connection request is received from cloud server 400, the user identification information for identifying the representative user associated by the association information with cloud server 400 and MFP 100 is transmitted to cloud server 400. Then, cloud server 400 embeds the user identification information received from management server 300 into a job to be transmitted to MFP 100. Since MFP 100 detects the representative user on the basis of the user identification information included in the job received from cloud server 400, the user who operates cloud server 400 as the representative user may cause MFP 100 to execute a process.

Further, MFP 100 registers a representative user who represents the members of Company B permitted to use cloud server 400, and for-loan association information registered in management server 300 associates MFP 100 with the representative user registered in the MFP 100. In the case where the user identification information of the representative user is received from MFP 100, management server 300 specifies cloud server 400 associated by the for-loan association information with the representative user and MFP 100, transmits to gateway device 200 a connection instruction to connect MFP 100 with the specified cloud server 400. At a stage before the connection instruction is received, gateway device 200 relays communications between MFP 100 and management server 300, and at a stage after the connection instruction is received, gateway device 200 relays communications between cloud server 400 and MFP 100. Thus, the representative user who operates MFP 100 may cause cloud server 400 to execute a process.

In the foregoing embodiments, the connection control system has been described by way of example. However, it is needless to say that the present invention can be understood as a connection support method for allowing management server 300 to execute the connection support processes shown in FIGS. 16 to 29, or as a connection support program for causing CPU 301 controlling management server 300 to execute the connection support method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A connection control system including a management server disposed outside a firewall and capable of supporting connection of communications between a control target device disposed inside the firewall and a cloud server that is a separate device than the management server and is disposed outside the firewall, and a relay device capable of communicating with the control target device disposed inside the firewall, the management server and the cloud server being independently connected to the internet, the connection control system comprising:
a hardware processor included in said management server configured to execute
an internal common setting step of registering association information for associating said control target device with said cloud sever and said relay device,
a server-side session establishing step of, on the basis of a request from said relay device, establishing an always-on session for communicating between said management server and said relay device, and
a connection instructing step of, in response to reception of a connection request of specifying said control target device connected to said relay device from the cloud server, transmitting via said established always-on session to said relay device specified by said connection request a connection instruction to relay communications between the control target device specified by said connection request and said cloud server associated by said association information with the control target device specified by said connection request while the always-on session between said management server and said relay device is established; and
a hardware processor included in said relay device configured to execute
a first communication session establishing step of, in response to reception of said connection request, establishing a first communication session with said cloud server specified by said connection instruction,
a second communication session establishing step of establishing a second communication session with said control target device, and
a relay step of relaying communications between said cloud server and said control target device, using said first and second communication sessions.

2. The connection control system according to claim 1, wherein
the hardware processor included in said management server further executes a device connection request receiving step of receiving from said cloud server a device connection request of requesting a connection with said control target device,
said connection instructing step includes a cloud connection instructing step of transmitting said connection instruction on the condition that said control target device specified by said received device connection request is associated with said cloud server by said association information, and
said second communication session establishing step includes a cloud activation establishing step of, in response to reception of said connection instruction, establishing a second communication session with said control target device specified by said connection instruction.

3. The connection control system according to claim 2, wherein the hardware processor included in said cloud server executes
an external common setting step of registering said control target device in association with said relay device and said management server, and
a server-side session connection requesting step of, in response to an event that a connection to said registered control target device is instructed, transmitting said device connection request to said management server registered in association with said control target device.

4. The connection control system according to claim 2, wherein
said connection instruction transmitted in said cloud connection instructing step includes a connection request specification information to specify a device connection request received from said cloud server, said first communication session establishing step includes a connection request specification information transmitting step of, upon establishment of said first communication session, transmitting to said cloud server a connection request specification information included in said connection instruction, and the hardware processor included in said cloud server includes an association step of associating said device connection request with said first communication session on the basis of said connection request specification information received from said relay device.

5. The connection control system according to claim 1, wherein the hardware processor included in said control target device executes a user registering step of registering a user, a user detecting step of detecting a user, and a process executing step of, on the condition that said detected user is said registered user, executing a job according to an instruction by said detected user, in said user registering step, a user representing one or more users authorized to use said cloud server is registered as a representative user, said internal common setting step includes a step of registering association information further associating said representative user registered in said control target device with said control target device in addition to said cloud server and said relay device, the hardware processor included in said management server further executes, in the case where a device connection request is received from said cloud server, a user identification information transmitting step of transmitting to said cloud server user identification information for identifying a representative user associated by said association information with said cloud server and said control target device specified by said device connection request, the hardware processor included in said cloud server executes a user identification information embedding step of embedding user identification information received from said management server into a job transmitted to said control target device via said second communication session, and said user detecting step includes a step of detecting said representative user on the basis of user identification information included in a job received from said cloud server via said second communication session.

6. The connection control system according to claim 1, wherein the hardware processor included in said control target device executes a user registering step of registering a user, a user detecting step of detecting a user, and a process executing step of, on the condition that said detected user is said registered user, executing a job according to an instruction by said detected user, in said user registering step, a user representing one or more users authorized to use said cloud server is registered as a representative user, said internal common setting step includes a step of registering association information further associating said representative user registered in said control target device with said control target device in addition to said cloud server and said relay device, said process executing step includes an activating step of transmitting to said management server user identification information for identifying said detected user, the hardware processor included in said management server further executes a specifying step of, in the case where user identification information of said representative user is received from said control target device, specifying said cloud server associated by said association information with said representative user and said control target device, said connection instructing step includes a device connection instructing step of, in the case where user identification information of said representative user is received from said control target device, transmitting a connection instruction to connect said control target device to said cloud server specified in said specifying step, said second communication session establishing step includes an activation establishing step of, in response to reception of a request from said control target device, establishing a second communication session with said control target device, and said relay step includes a step of, at a stage before said connection instruction is received, relaying communications between said control target device and said management server, using said second communication session and said always-on session, and at a stage after said connection instruction is received, relaying communications between said cloud server and said control target device, using said first communication session and said second communication session.

7. A management server disposed outside a firewall and capable of causing a relay device disposed inside the firewall to relay communications between a control target device disposed inside the firewall and a cloud server that is a separate device than the management server and is disposed outside the firewall, the management server and the cloud server being independently connected to the internet, the management server comprising:

a hardware processor included in said management server configured to execute an internal common setting step of registering association information for associating said control target device with said cloud sever and said relay device, a server-side session establishing step of, on the basis of a request from said relay device, establishing an always-on session for communicating with between said management server and said relay device, and a connection instructing step of, in response to reception of a connection request of specifying said control target device connected to said relay device from the cloud server, transmitting via said established always-on session to said relay device specified by said connection request a connection instruction to connect the control target device specified by said connection request to said cloud server associated by said association information with the control target device specified by said connection request while the always-on session between said management server and said relay device is established.

8. The management server according to claim 7, wherein the hardware processor included in said management server further executes a device connection request receiving step of receiving from said cloud server a device connection request of requesting a connection with said control target device, and said connection instructing step includes a cloud connection instructing step of transmitting said connection instruction on the condition that said control target device specified by said received device connection request is associated with said cloud server by said association information.

9. The management server according to claim 7, wherein
said internal common setting step includes a step of registering association information further associating said representative user registered in said control target device with said control target device in addition to said cloud server and said relay device,
the hardware processor included in said management server further executes a specifying step of, in the case where user identification information of said representative user is received from said control target device, specifying said representative user and said cloud server associated by said association information with said control target device, and
said connection instructing step includes a device connection instructing step of, in the case where user identification information of said representative user is received from said control target device, transmitting a connection instruction to connect said control target device to said cloud server specified in said specifying step.

10. A connection support method performed by a management server disposed outside a firewall and capable of causing a relay device disposed inside the firewall to relay communications between a control target device disposed inside the firewall and a cloud server that is a separate device than the management server and is disposed outside the firewall, the management server and the cloud server being independently connected to the internet, the method comprising:
an internal common setting step of registering association information for associating said control target device with said cloud sever and said relay device,
a server-side session establishing step of, on the basis of a request from said relay device, establishing an always-on session for communicating between said management server and said relay device, and
a connection instructing step of, in response to reception of a connection request of specifying said control target device connected to said relay device from the cloud server, transmitting via said established always-on session to said relay device specified by said connection request a connection instruction to relay communications between the control target device specified by said connection request and said cloud server associated by said association information with the control target device specified by said connection request while the always-on session between said management server and said relay device is established.

11. The connection support method according to claim 10, further comprising a device connection request receiving step of receiving from said cloud server a device connection request of requesting a connection with said control target device, wherein
said connection instructing step includes a cloud connection instructing step of transmitting said connection instruction on the condition that said control target device specified by said received device connection request is associated with said cloud server by said association information.

12. The connection support method according to claim 10, wherein
said internal common setting step includes a step of registering association information further associating said representative user registered in said control target device with said control target device in addition to said cloud server and said relay device,
said connection support method further includes a specifying step of, in the case where user identification information of said representative user is received from said control target device, specifying said representative user and said cloud server associated by said association information with said control target device, and
said connection instructing step includes a device connection instructing step of, in the case where user identification information of said representative user is received from said control target device, transmitting a connection instruction to connect said control target device to said cloud server specified in said specifying step.

13. A non-transitory computer-readable recording medium encoded with a connection support program executed by a computer controlling a management server disposed outside a firewall and capable of causing a relay device disposed inside the firewall to relay communications between a control target device disposed inside the firewall and a cloud server that is a separate device than the management server and is disposed outside the firewall, the management server and the cloud server being independently connected to the internet, wherein the connection support program causes the computer to execute:
an internal common setting step of registering association information for associating said control target device with said cloud sever and said relay device;
a server-side session establishing step of, on the basis of a request from said relay device, establishing an always-on session for communicating between said management server and said relay device; and
a connection instructing step of, in response to reception of a connection request of specifying said control target device connected to said relay device from the cloud server, transmitting via said established always-on session to said relay device specified by said connection request a connection instruction to relay communications between the control target device specified by said connection request and said cloud server associated by said association information with the control target device specified by said connection request while the always-on session between said management server and said relay device is established.

14. The non-transitory computer-readable recording medium encoded with a connection support program according to claim 13, further causing the computer to execute a device connection request receiving step of receiving from said cloud server a device connection request of requesting a connection with said control target device, wherein
said connection instructing step includes a cloud connection instructing step of transmitting said connection instruction on the condition that said control target device specified by said received device connection request is associated with said cloud server by said association information.

15. The non-transitory computer-readable recording medium encoded with a connection support program according to claim 14, wherein
said internal common setting step includes a step of registering association information further associating said representative user registered in said control target device with said control target device in addition to said cloud server and said relay device, the connection support program further causes the computer to execute a specifying step of, in the case where user identification information of said representative user is received from said control target device, specifying said representative user and said cloud server associated by said association information with said control target device, and said connection instructing step includes a device connection instructing step of, in the case where user identification information of said representative user is received from said control target device, transmitting a connection instruction to connect said control target device to said cloud server specified in said specifying step.

16. The connection control system according to claim 1, wherein the control target device is a multi-function peripheral.

17. The management server according to claim 7, wherein the control target device is a multi-function peripheral.

18. The connection support method according to claim 10, wherein the control target device is a multi-function peripheral.

19. The non-transitory computer-readable recording medium encoded with a connection support program according to claim 13, wherein the control target device is a multi-function peripheral.

* * * * *